US012753938B2

(12) United States Patent
Goodman et al.

(10) Patent No.: US 12,753,938 B2
(45) Date of Patent: Oct. 6, 2026

(54) DEVICE BASED ON ACTIVITY WITHIN PROPERTY

(71) Applicant: Alarm.com Incorporated, Tysons, VA (US)

(72) Inventors: Daniel Goodman, Needham, MA (US); Craig Carl Heffernan, Oregon City, OR (US)

(73) Assignee: Alarm.com Incorporated, Tysons, VA (US)

( * ) Notice: Subject to any disclaimer, the term of this patent is extended or adjusted under 35 U.S.C. 154(b) by 910 days.

(21) Appl. No.: 17/954,706

(22) Filed: Sep. 28, 2022

(65) Prior Publication Data

US 2023/0014112 A1 Jan. 19, 2023

Related U.S. Application Data

(63) Continuation of application No. 17/113,394, filed on Dec. 7, 2020, now Pat. No. 11,460,205, which is a (Continued)

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *G05B 19/048* (2013.01); (Continued)

(58) Field of Classification Search
CPC ........ F24F 11/30; F24F 11/62; F24F 2110/00; F24F 2110/10; F24F 2120/10;
(Continued)

(56) References Cited

U.S. PATENT DOCUMENTS

2005/0040247 A1 2/2005 Pouchak
2005/0040249 A1 2/2005 Wacker et al.
(Continued)

OTHER PUBLICATIONS

U.S. Non-Final Office Action for U.S. Appl. No. 14/447,297 dated Nov. 18, 2016, 20 pages.
(Continued)

*Primary Examiner* — Ziaul Karim
(74) *Attorney, Agent, or Firm* — Fish & Richardson P.C.

(57) ABSTRACT

Controller technology, in which data specifying a user preference relating to an environmental parameter for a property is received. Based on data collected by a monitoring system, a location of one or more users within the property is identified. Environmental condition data for the property is accessed, the environmental condition data including environmental condition data for the location of the users within the property and other unoccupied locations within the property. The environmental condition data for the property is analyzed with respect to the preference relating to the environmental parameter for the property. Based on the analysis of the environmental condition data for the property with respect to the preference relating to the environmental parameter for the property, a setting for at least one component of an HVAC system is determined. The at least one component of the HVAC system is controlled according to the determined setting.

20 Claims, 10 Drawing Sheets

Related U.S. Application Data continuation of application No. 16/403,763, filed on May 6, 2019, now Pat. No. 10,859,283, which is a continuation of application No. 15/478,345, filed on Apr. 4, 2017, now Pat. No. 10,281,896, which is a continuation of application No. 14/447,297, filed on Jul. 30, 2014, now Pat. No. 9,696,055.

(60) Provisional application No. 61/859,840, filed on Jul. 30, 2013.

(51) Int. Cl.

| | |
|---|---|
| ***F24F 110/00*** | (2018.01) |
| ***F24F 110/10*** | (2018.01) |
| ***F24F 120/10*** | (2018.01) |
| ***F24F 120/12*** | (2018.01) |
| ***F24F 120/14*** | (2018.01) |
| ***G05B 19/048*** | (2006.01) |
| ***G05D 23/19*** | (2006.01) |

(52) U.S. Cl.
CPC ...... *G05D 23/1932* (2013.01); *F24F 2110/00* (2018.01); *F24F 2110/10* (2018.01); *F24F 2120/10* (2018.01); *F24F 2120/12* (2018.01); *F24F 2120/14* (2018.01); *G05B 2219/2614* (2013.01)

(58) Field of Classification Search
CPC ......................... F24F 2120/12; F24F 2120/14; G05B 19/048; G05B 2219/2614; G05D 23/1932
See application file for complete search history.

(56) References Cited

U.S. PATENT DOCUMENTS

| | | | | |
|---|---|---|---|---|
| 2009/0001181 | A1* | 1/2009 | Siddaramanna | F23N 5/203 236/46 R |
| 2010/0070089 | A1* | 3/2010 | Harrod | G06F 8/34 700/277 |
| 2010/0324962 | A1* | 12/2010 | Nesler | G05B 17/02 705/412 |
| 2011/0178977 | A1* | 7/2011 | Drees | G06Q 10/04 706/52 |
| 2012/0066168 | A1 | 3/2012 | Fadell et al. | |
| 2012/0143356 | A1 | 6/2012 | Berg-Sonne et al. | |
| 2013/0024799 | A1* | 1/2013 | Fadell | F24F 11/64 715/771 |
| 2013/0030600 | A1 | 1/2013 | Shetty et al. | |
| 2013/0030732 | A1 | 1/2013 | Shetty et al. | |
| 2013/0103207 | A1* | 4/2013 | Ruff | G01K 1/02 700/278 |
| 2014/0085093 | A1* | 3/2014 | Mittleman | G08B 21/14 29/832 |
| 2014/0172400 | A1* | 6/2014 | Majewski | F24F 1/0035 702/34 |
| 2014/0207281 | A1* | 7/2014 | Angle | B25J 13/006 700/257 |
| 2014/0277757 | A1 | 9/2014 | Wang et al. | |
| 2014/0277765 | A1 | 9/2014 | Karimi et al. | |

OTHER PUBLICATIONS

U.S. Notice of Allowance for U.S. Appl. No. 14/447,297 dated Mar. 8, 2017, 20 pages.

* cited by examiner

200

DEVICE BASED ON ACTIVITY WITHIN PROPERTY

CROSS-REFERENCE TO RELATED APPLICATIONS

This application is a continuation of Ser. No. 17/113,394, filed Dec. 7, 2020, which is a continuation of Ser. No. 16/403,763, filed May 6, 2019, which is a continuation of Ser. No. 15/478,345, filed Apr. 4, 2017, which is a continuation of U.S. application Ser. No. 14/447,297, filed Jul. 30, 2014, which claims the benefit of U.S. Provisional Application No. 61/859,840, filed Jul. 30, 2013. All of these applications are incorporated herein by reference in their entirety for all purposes.

TECHNICAL FIELD

This application relates to system control based on location data.

BACKGROUND

Heating, ventilation, and air conditioning (HVAC) systems can utilize control devices such as thermostats to allow users of a property associated with the HVAC system to control environmental conditions within the property. In some cases, an HVAC system control device can obtain information for a location of the property to determine operation of the HVAC system components, such as the control of one or more air conditioners, furnaces, humidifiers, fans, boilers, or other HVAC system components.

SUMMARY

Techniques are described for the control of an HVAC system associated with a property using a disaggregated thermostat that obtains data indicating environmental conditions at various locations within the property and location information that indicates likely locations of users within the property.

Implementations of the described techniques may include hardware, a method or process implemented at least partially by hardware, or a computer-readable storage medium encoded with executable instructions that, when executed by a processor, perform operations.

The details of one or more implementations are set forth in the accompanying description below. Other features will be apparent from the description and the drawings.

DETAILED DESCRIPTION

Techniques are described for providing indoor environmental monitoring and control. In some implementations, a control system that includes a thermostat is able to control the environment within a home, business, vacation, or other property based on data received from sensors within the property and other data. The control system analyzes the data and controls heating, ventilation, and air conditioning (HVAC) systems associated with the property to achieve a target environment within the property. The control system also tracks physical locations of users within the property and physical locations of mobile devices associated with users of the property, and uses the physical location information to automatically set the thermostat associated with the property. Automated thermostat control may provide improved user comfort and/or improved energy efficiency.

In some implementations, the control system may operate a single thermostat as a disaggregated thermostat that intelligently controls temperature within different zones of a property. In these implementations, sensors throughout different zones of the property can detect information relating to the environment in those zones, such as the temperature and humidity in each of the zones, and the occupancy of the zones. Based on determining that a particular zone of the property is occupied, the disaggregated thermostat can access sensor data indicating the temperature and humidity in that zone, and can operate the HVAC system associated with the property to achieve a target temperature and/or humidity based on the detected temperature and humidity in the particular zone. HVAC system control using the disaggregated thermostat can address issues of hot and cold zones that are common in properties as a result of a traditional thermostat determining control of the property's HVAC system based on temperature and humidity measurements taken at only a single location within the property. The disaggregated thermostat may intelligently use occupancy information to modify temperatures in hot and cold zones to make a zone being occupied most comfortable for a user, even though the modification results in a less desirable temperature in another zone.

Figure 1A:
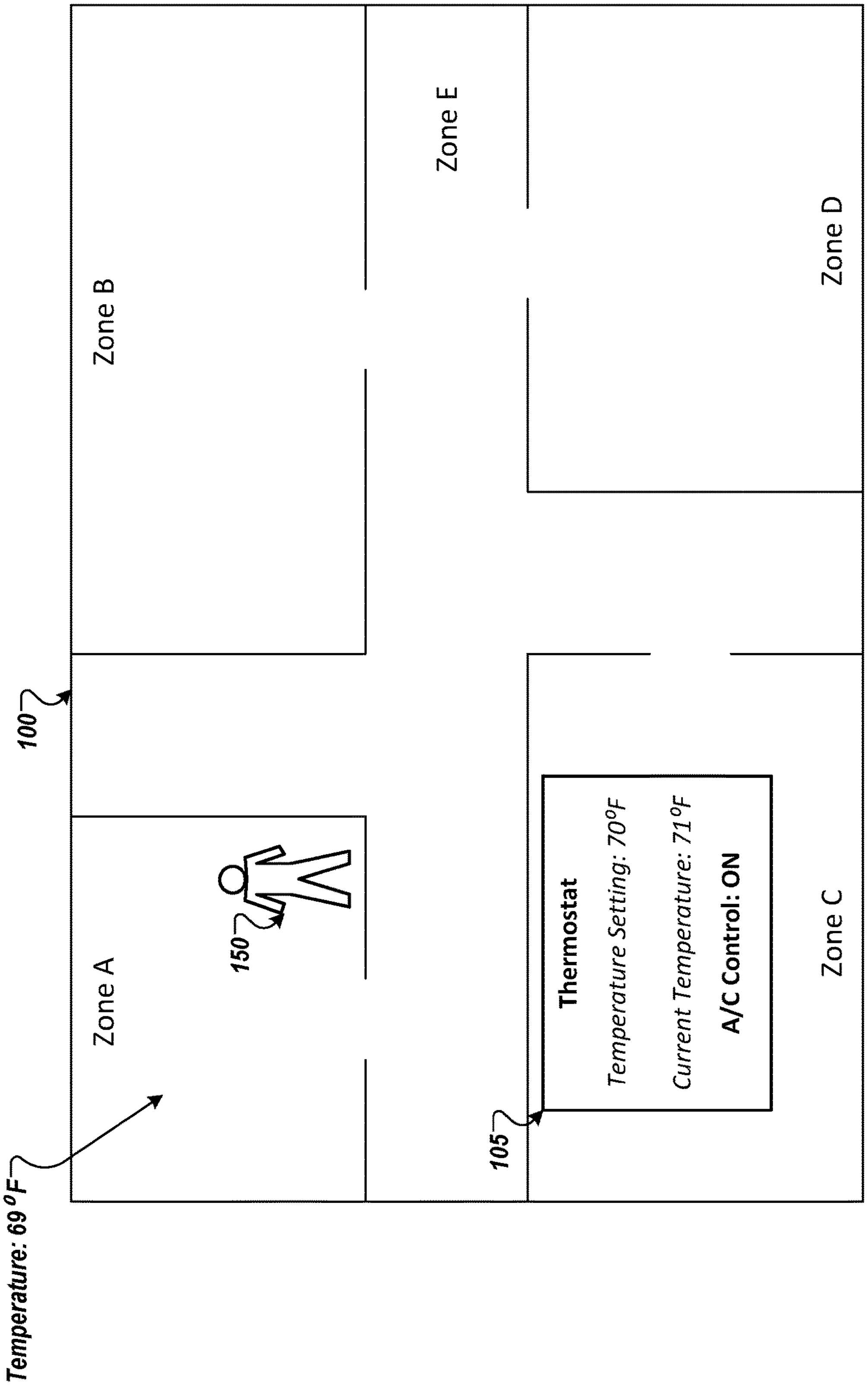
FIGS. 1A-1C illustrate an example of controlling an HVAC system using a disaggregated thermostat system.
Figure 1B:
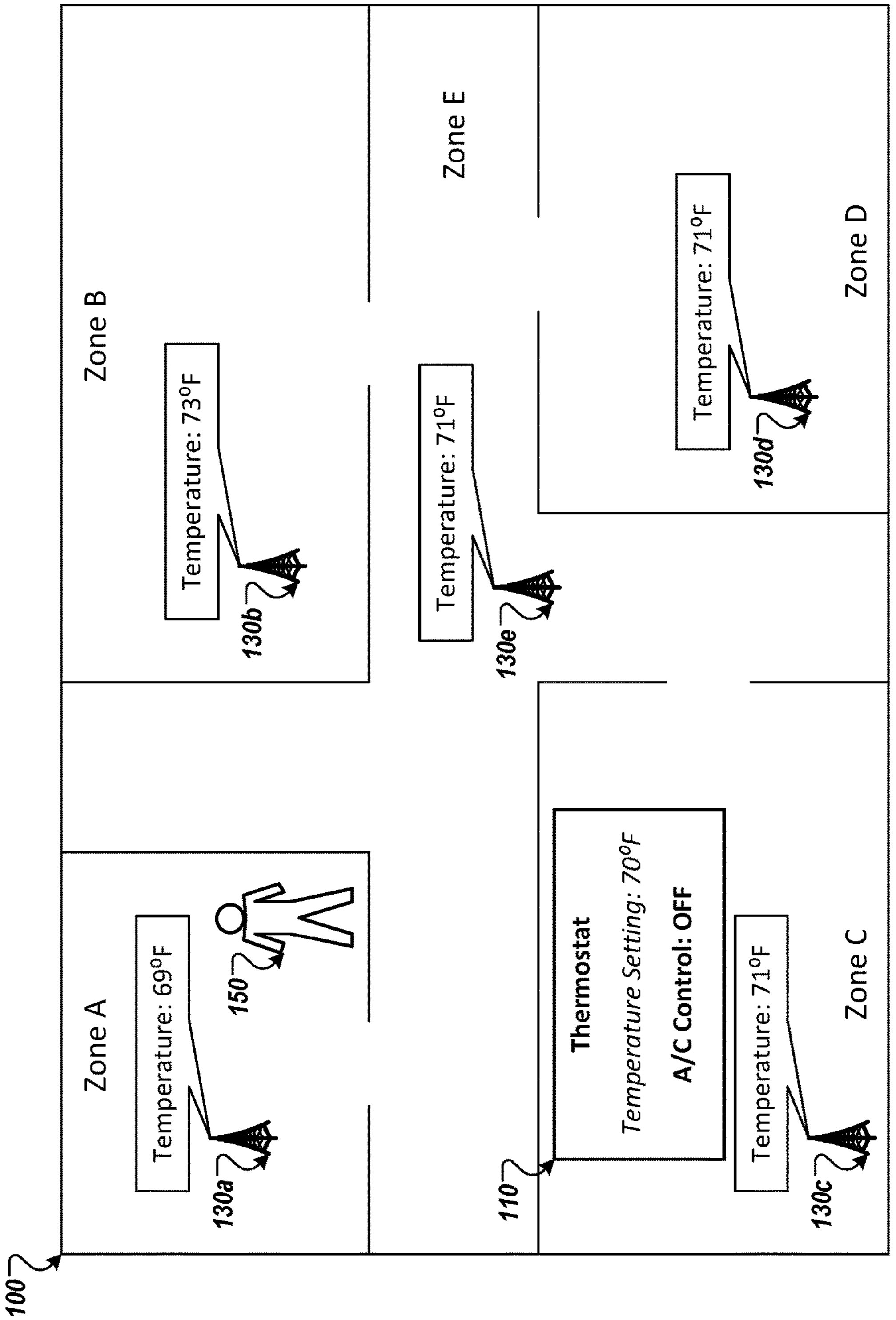
Figure 1C:
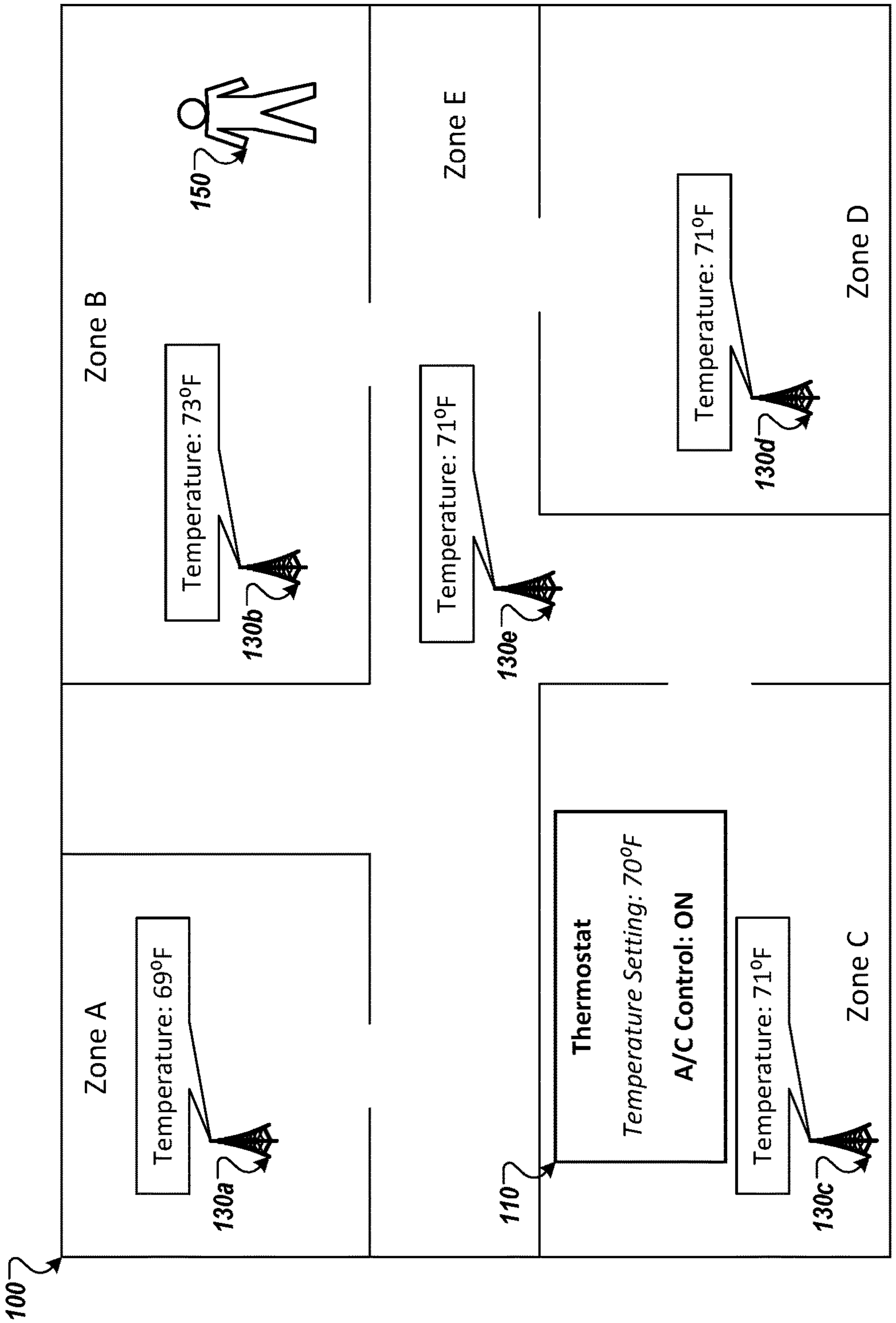

FIGS. 1A-1C illustrate an example in which a disaggregated thermostat is used to control an HVAC system associated with a property. FIG. 1A illustrates an example in which an environmental parameter, such as temperature, humidity, etc., is controlled by a thermostat that is not a disaggregated thermostat. For example, the property of FIG. 1A includes a thermostat that only measures temperature at the location of the thermostat. The thermostat of FIG. 1A can control an air conditioner associated with the property to achieve a target temperature within the property based only on the temperature measurement obtained from the location of the thermostat. FIGS. 1B and 1C illustrate an example in which an environmental parameter at a property is controlled by a disaggregated thermostat. For example, the property of FIGS. 1B and 1C is associated with a system that is able to determine a condition of the environmental parameter in multiple locations throughout the property, as well as the presence of users at various locations throughout the property. The disaggregated thermostat can determine the control of the HVAC system based on the condition of the environmental parameter at the occupied locations of the property. For example, the disaggregated thermostat can determine that a temperature where a user is located is above a target temperature, and in response, the disaggregated thermostat can turn on an air conditioner to achieve the target temperature at the location within the property where the user is located.

In further detail, FIG. 1A illustrates a property 100 that is associated with a thermostat 105 that is not a disaggregated thermostat. The property 100 may be associated with an HVAC system that includes an air conditioner. The thermostat 105 of the property 100 may be able to receive data indicating a setting for an environmental parameter, in this case, a temperature setting of 70° F. The thermostat 105 may also be able to detect a condition of the environmental parameter at the location of the thermostat 105. For example, the thermostat 105 may include a temperature sensor that can determine the temperature at the location of the thermostat 105. The thermostat 105 can control the air conditioner based on analyzing the temperature at the location of the thermostat 105 with respect to the temperature setting. For example, the thermostat 105 can determine that the temperature at the location of the thermostat 105 is 71° F., and based on determining that the current temperature of 71° F. is greater than the target temperature of 70° F., can turn on the air conditioner.

In some instances, controlling the air conditioner based on a comparison of the temperature at the location of the thermostat 105 to the target temperature is not particularly helpful, since the temperature may vary at different locations throughout the property. For example, a user 150 may be located in a different area ("Zone A") of the property 100 than the thermostat 105 ("Zone C"). While the temperature at the location of the thermostat 105 may be 71° F., the temperature where the user 150 is located may be 69° F. When the thermostat 105 determines to turn on the air conditioner based on determining that the temperature at the location of the thermostat 105 is above the target temperature, this may cause the temperature at the location of the user 150 to further decrease, for example, to 68° F. Thus, controlling the air conditioner based only on the temperature at a single location (e.g., the location of the thermostat 105) can cause the temperature where the user 150 is located to diverge further from the target temperature. Therefore, controlling the air conditioner based on the temperature at the location of the user 150 is advantageous in that the temperature at the location of the user 150 will be adjusted towards the target temperature, even if the temperature at other locations of the property diverge further from the target temperature.

FIG. 1B shows an example of a property 100 that is associated with an HVAC system that is controlled by a disaggregated thermostat 110. For example, the property 100 of FIG. 1A and the property of FIG. 1B may be the same or a similar property that is associated with an HVAC system also having an air conditioner, where the air conditioner is controlled by the disaggregated thermostat 110. The disaggregated thermostat 110 is associated with sensors 130*a*-130*e* that are each configured to detect the condition of one or more environmental parameters. For example, each sensor 130*a*-130*e* may be a temperature sensor that can determine the temperature at a particular location of the property 100. The disaggregated thermostat 110 may also be associated with sensors that are capable of determining conditions indicative of users being present in a particular location within the property. For example, each of "Zone A" through "Zone E" of the property 100 may include a motion sensor that can detect the presence of a user within that zone. In some implementations, the sensors configured to detect the presence of users in various locations can be the same sensors 130*a*-130*e* that are also configured to detect the condition of environmental parameters at the property 100. In addition, the sensors capable of detecting the presence of users and the sensors 130*a*-130*e* capable of detecting the condition of the environmental parameters may be different sensors and/or sensors that are located in different locations within the property 100. For example, the sensors capable of detecting the presence of users may be associated with a monitoring system that is associated with the disaggregated thermostat 110. The disaggregated thermostat 110 can receiving information from the sensors 130*a*-130*e* indicating the condition of the environmental parameters at the various zones of the property 100, for example, the temperature at the various zones of the property 100, and the disaggregated thermostat 110 can also receive the information indicating the presence of users in the various zones of the property 100. The disaggregated thermostat can also receive information indicating a preference for a target environmental parameter, for example, a target temperature for the property 100. The disaggregated thermostat 110 can control components of the property's 100 HVAC system, such as an air conditioner of the property 100, based on the received data.

In the example shown in FIG. 1B, for instance, a user has set a preferred temperature of 70° F. for the property 100. The disaggregated thermostat 110 can receive information indicating the temperature at various zones of the property 100. For example, the sensors 130*a*-130*e* can determine that the temperature in the zones "Zone A" through "Zone E" of the property 100 are 69° F., 73° F., 71° F., 71° F., and 71° F., respectively. The disaggregated thermostat 110 can also receive information indicating that a user 150 is likely located in "Zone A" of the property 100, based on data received from the sensors associated with the disaggregated thermostat 110 that are able to detect the presence of users (e.g., motion sensors). Further, the disaggregated thermostat 110 can receive data indicating the lack of users in zones of the property, for example, data indicating that users have not been detected in any of "Zone B" through "Zone E."

The disaggregated thermostat 110 can analyze the received data to determine control of an air conditioner associated with the property 100 that is controllable by the disaggregated thermostat 110. For example, the disaggregated thermostat 110 can compare the temperature at "Zone A," occupied by the user 150, to the preferred temperature. Based on determining that the temperature at the location occupied by the user 150 (e.g., 69° F.) is lower than the preferred temperature for the property (e.g., 70° F.), the disaggregated thermostat 110 can determine to turn off the air conditioner, or in the event that the air conditioner has previously been turned off, to maintain the air conditioner in an off state. By not turning the air conditioning on, the temperature at the location of the user 150 may be able to increase toward the target temperature of 70° F., even if that causes the temperature in other zones of the property (e.g., the zones "Zone B" through "Zone E") to increase further beyond the target temperature.

Similarly, the example shown in FIG. 1C illustrates a scenario in which the user 150 is located at a zone of the property 100 ("Zone B") in which the detected temperature is higher than the temperature setting for the property 100. For example, the disaggregated thermostat 110 can receive information indicating that a user 150 is located in "Zone B" of the property 100, and that the other zones of the property 100 are unoccupied. The disaggregated thermostat 110 may also receive information that indicates the temperature at the various zones of the property 100, for example, that the temperature at "Zone B" of the property 100 is 73° F. Based on the received information, the disaggregated thermostat 110 may determine that the current temperature in the occupied zone of the property 100 is above the target temperature for the property 100, and may therefore turn on an air conditioner associated with the property. By turning on the air conditioner, the temperature in the occupied zone of the property 100 may be adjusted toward the preferred temperature of 70° F., even if this causes the temperature in other zones of the property to become further from the preferred temperature. For example, the disaggregated thermostat 110 may turn on the air conditioner to cool the property despite the temperature at "Zone A" already being below the target temperature. In some examples, the disaggregated thermostat 110 may determine to turn on the air conditioner based on determining that the user 150 has moved from the location shown in FIG. 1B, "Zone A," where the temperature is below the target temperature of 70° F., to the location shown in FIG. 1C, "Zone B," where the temperature is above the target temperature. Other factors may be considered by the disaggregated thermostat 110 when determining how to control the HVAC system components associated with the property 100, as described hereafter.

Figure 2:
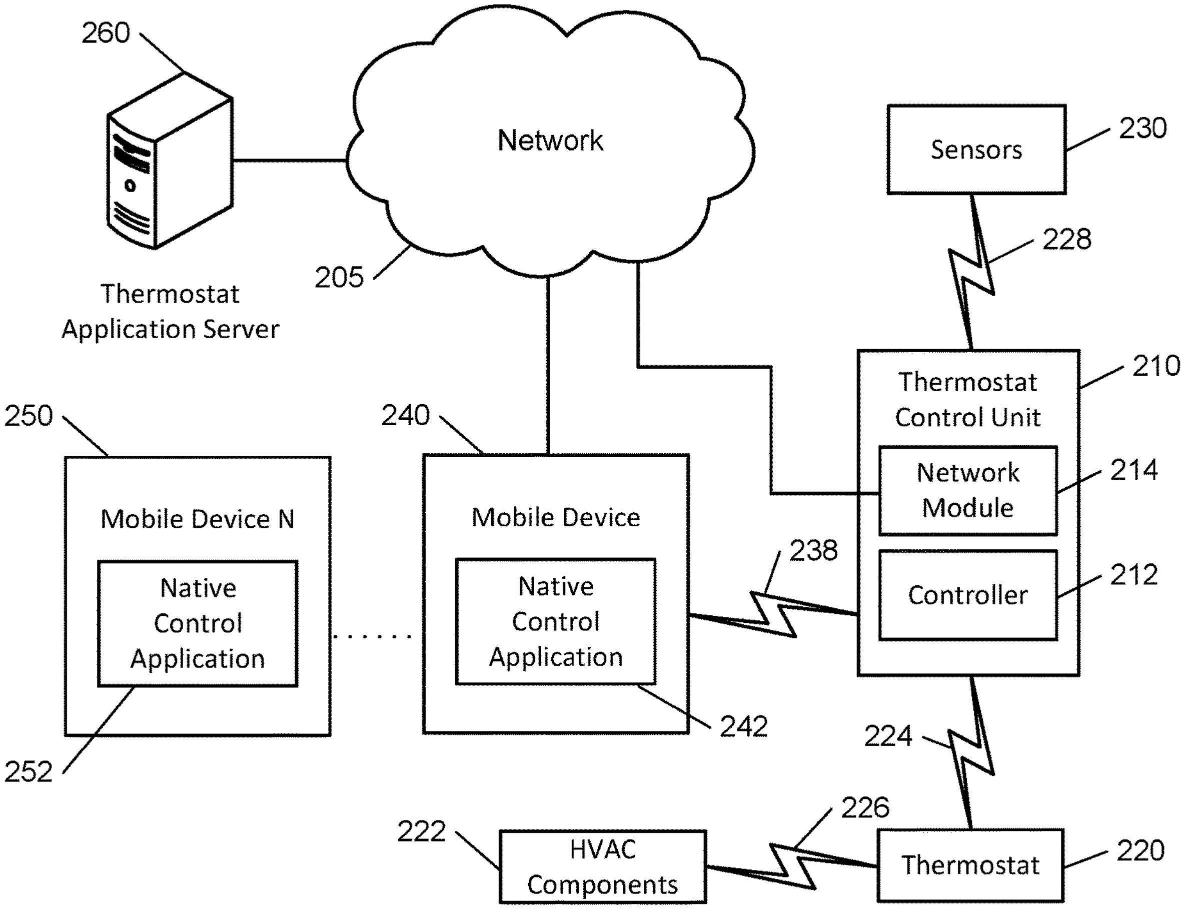
FIG. 2 illustrates an example system capable of controlling an HVAC system using a disaggregated thermostat system.

FIG. 2 illustrates an example of a control system 200 configured to provide dynamic environmental control within a property. The control system 200 includes a network 205, a thermostat control unit 210, one or more mobile devices 240, 250, and a control application server 260. In some examples, the network 205 enables communications between the thermostat control unit 210, the one or more mobile devices 240, 250, and the control application server 260.

The network 205 is configured to enable electronic communications between devices connected to the network 205. For example, the network 205 can be configured to enable exchange of electronic communications between the thermostat control unit 210, the one or more mobile devices 240, 250, and the control application server 260.

The network 205 can include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 205 can include multiple networks or subnetworks, each of which can include, for example, a wired or wireless data pathway. The network 205 can include a circuit-switched network, a packet-switched data network, or any other network able to carry electronic communications (e.g., data or voice communications). For example, the network 205 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 205 can include one or more networks that include wireless data channels and wireless voice channels. The network 205 can be a wireless network, a broadband network, or a combination of networks including a wireless network and a broadband network.

The thermostat control unit 210 includes a controller 212 and a network module 214. The controller 212 is configured to control a system, e.g., an HVAC system associated with a property, that includes the thermostat control unit 210. In some examples, the controller 212 can include a processor or other control circuitry configured to execute instructions of a program that controls operation of an HVAC system. In these examples, the controller 212 can be configured to receive input from sensors, detectors, or other devices associated with the HVAC system and control operation of components of the HVAC system, e.g., a furnace, humidifier, dehumidifier, or air conditioner, or other devices associated with the property, e.g., an appliance, lights, etc. For example, the controller 212 can be configured to control operation of the network module 214 included in the thermostat control unit 210.

The network module 214 is a communication device configured to exchange communications over the network 205. The network module 214 can be a wireless communication module configured to exchange wireless communications over the network 205. For example, the network module 214 can be a wireless communication device configured to exchange communications over a wireless data channel. In this example, the network module 214 can transmit user location data within or external to the property, environmental data from the property, e.g., the condition of environmental parameters indoors at the property or outdoors at the property, or other data over a wireless data channel. The wireless communication device can include one or more GSM modules, a radio modem, a cellular transmission module, or any type of module configured to exchange communications in one of the following formats: GSM or GPRS, CDMA, EDGE or EGPRS, EV-DO or EVDO, UMTS, or IP.

The network module 214 can also be a wired communication module configured to exchange communications over the network 205 using a wired connection. For instance, the network module 214 can be a modem, a network interface card, or another type of network interface device. The network module 214 can be an Ethernet network card configured to enable the thermostat control unit 210 to communicate over a local area network and/or the Internet. The network module 214 can also be a voiceband modem configured to enable the thermostat control unit 210 to communicate over the telephone lines of Plain Old Telephone Systems (POTS). In some implementations, the thermostat control unit 210 can be a broadband or cellular gateway where the network module 214 can enable the thermostat control unit 210 to communicate over the network 205.

The control system that includes the thermostat control unit 210 communicates with modules 220 and 230 to perform dynamic environmental control at the property. The module 220 is connected to a thermostat, is configured to monitor temperature and/or energy consumption of an HVAC system associated with the thermostat, and is further configured to provide control of the thermostat. In some instances, monitoring the energy consumption of the HVAC system can involve determining an amount of other resources, for example, other fuels or energy sources, consumed by the HVAC system. In some implementations, the module 220 can additionally or alternatively receive data relating to activity at a property and/or environmental data at a property, e.g., at various locations indoors and outdoors at the property. The module 220 can directly measure energy or resource consumption of the HVAC system associated with the thermostat, or can estimate energy or resource consumption of the HVAC system associated with the thermostat, for example, based on detected usage of one or more components of the HVAC system associated with the thermostat. Measuring energy or resource consumption by the HVAC system associated with the thermostat may involve determining an amount of electrical energy used by HVAC system (e.g., in units of kilowatt-hours), may involve determining an amount of natural gas, propane, butane, oil, or gasoline consumed by the HVAC system, or can involve determining the usage of other energy sources by the HVAC system. The module 220 can communicate temperature and/or energy monitoring information to or from the thermostat control unit 210 and can control the thermostat based on commands received from the thermostat control unit 210.

In some implementations, the module 220 associated with the dynamically programmable thermostat can be integrated with the thermostat control unit 210. For example, the dynamically programmable thermostat can include the thermostat control unit 210, e.g., as an internal component to the dynamically programmable thermostat. In other embodiments, the thermostat control unit 210 can be a gateway device that communicates with the module 220 associated with the dynamically programmable thermostat.

The module 222 is connected to one or more components of an HVAC system associated with a property, and is configured to control operation of the one or more components of the HVAC system. In some implementations, the module 222 is also configured to monitor energy consumption of the HVAC system components, for example, by directly measuring the energy consumption of the HVAC system components or by estimating the energy usage of the one or more HVAC system components based on detecting usage of components of the HVAC system. The module 222 can communicate energy monitoring information and the state of the HVAC system components to the module 220 associated with the disaggregated thermostat and can control the one or more components of the HVAC system based on commands received from the module 220 associated with the disaggregated thermostat.

The module 230 is connected to one or more sensors configured to monitor activity within the property and the environment at the property at various locations, e.g., at various indoor and outdoor locations at the property. For example, the sensors connected to the module 230 can include environmental sensors, such as temperature sensors, humidity sensors, noise sensors, light sensors, air quality sensors, smoke detectors, carbon monoxide detectors, water sensors, rain sensors, wind sensors, etc. The sensors can further include sensors for monitoring activity at the property, such as one or more motion sensors, contact sensors, etc. The module 230 connected to the one or more sensors can communicate data obtained by the sensors to the thermostat control unit 210. For example, the module 230 can transmit sensor data indicating activity within the property and data indicating environmental conditions at various locations within the property, e.g., a temperature and humidity in each room of a home, to the thermostat control unit 210.

The modules 220 and 230 can communicate with the controller 212 over communications links 224 and 228, and module 222 can communicate with the module 220 over communication link 226. The communication links 224, 226, and 228 can be wired or wireless data pathways configured to transmit signals from the modules 220, 230 to the controller 212 and from the module 222 to the module 220. The modules 220, 222, and 230 can continuously transmit sensed values to the controller 212, can periodically transmit sensed values to the controller 212, or can transmit sensed values to the controller 212 in response to a change in a sensed value.

In some implementations, the module 222 associated with one or more components of an HVAC system can communicate directly with the thermostat control unit 210. For example, the thermostat control unit 210 can communicate with the module 222 to send and/or receive information related to controlling the components of the HVAC system components, information relating to the energy usage of the HVAC system components, or other information. In some instances, the module 220 associated with the thermostat can communicate information to the thermostat control unit 210, and the thermostat control unit 210 can communicate the information received from the module 220 to the module 222 associated with the one or more HVAC system components. In still other implementations, one or more HVAC components 222 and the thermostat 220 may be capable of directly communicating with the thermostat application server 260. For example, the one or more HVAC components 222 and the thermostat 220 may be able to communicate and exchange information, such as information used to control the one or more HVAC components 222, to the thermostat application server 260 over the network 205. In such an implementation, the thermostat 220 may control the HVAC components 222 over the network 205, for example, by using the thermostat application server 260 as a communication gateway between the thermostat 220 and the HVAC components 222 (e.g., such that the thermostat application server 260 operates as a cloud-based gateway).

The control application server 260 is an electronic device configured to provide control services by exchanging electronic communications with the thermostat control unit 210 and the one or more mobile devices 240, 250 over the network 205. For example, the control application server 260 can be configured to monitor data obtained by the thermostat control unit 210. In this example, the control application server 260 can exchange electronic communications with the network module 214 included in the thermostat control unit 210 to send and/or receive information regarding activity at the property and/or the environment at the property. The control application server 260 also can receive information regarding activity within or external to the property from the one or more mobile devices 240, 250. For example, the control application server 260 can receive information from the one or more mobile devices 240, 250 that indicates the locations of the one or more mobile devices 240, 250.

In some implementations, the control application server 260 is a cloud-based server that is accessible over the network 205. In other implementations, the control application server 260 can be a physical server, blade server, mainframe, or other component that is accessible by the thermostat control unit 210 and/or the mobile devices 240, 250. For example, the control application server 260 can be a single server rack that is accessible by the thermostat control unit 210 and/or the mobile devices 240, 250.

In some implementations, the control application server 260 has access to weather data and/or weather forecast data, where the weather and/or weather forecast data can be used to perform dynamic environmental control within the property. For example, the control application server 260 can be connected to the Internet over the network 205 and can access the weather and/or weather forecast data at a website or database that is accessible on the Internet. The weather data can include current weather data, such as a current temperature, humidity, dew point, wind chill, heat index, etc., and the weather forecast data can include short and long term weather forecasts, for example, short and long term temperature forecasts, precipitation forecasts, etc.

The control application server 260 can store data, e.g., activity, environmental, and/or weather data, received from the thermostat control unit 210, the mobile devices 240, 250, and/or the Internet, and can perform analysis of the stored data. Based on the analysis, the control application server 260 can communicate with and control aspects of the thermostat control unit 210.

The one or more mobile devices 240, 250 are devices that host one or more native applications, e.g., the native control applications 242, 252. The one or more mobile devices 240, 250 can be cellular phones or non-cellular locally networked devices. The one or more mobile devices 240, 250 can include a cell phone, a smart phone, a tablet PC, a personal digital assistant ("PDA"), or any other portable device configured to communicate over a network. For example, implementations can also include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 240, 250 can be the same or can include mobile devices of different types. The one or more mobile devices 240, 250 can perform functions unrelated to the control system, such as placing personal telephone calls, playing music, playing video, displaying pictures, browsing the Internet, maintaining an electronic calendar, etc.

In some implementations, the one or more mobile devices 240, 250 communicate with and receive control system data from the thermostat control unit 210 using the communication link 238. For instance, the one or more mobile devices 240, 250 can communicate with the thermostat control unit 210 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more mobile devices 240, 250 can connect locally to the control system and its sensors and other devices. The local connection can improve the speed of communications because communicating through the network 205 with a remote server, e.g., the control application server 260, can be slower.

Although the one or more mobile devices 240, 250 are shown communicating with the thermostat control unit 210, the one or more mobile devices 240, 250 can communicate directly with the sensors and other devices controlled by the thermostat control unit 210. In some implementations, the one or more mobile devices 240, 250 replace the thermostat control unit 210 and perform the functions of the thermostat control unit 210 for local control and long range or offsite communication.

In other implementations, the one or more mobile devices 240, 250 receive control system data captured by the thermostat control unit 210 through the network 205. The one or more mobile devices 240, 250 can receive the data from the thermostat control unit 210 through the network 205 or the control application server 210 and can relay data received from the thermostat control unit 210 to the one or more mobile devices 240, 250 through the network 205. In this regard, the control application server 260 can facilitate communications between the one or more mobile devices 240, 250 and the thermostat control unit 210.

Although the one or more mobile devices 240, 250 are shown in FIG. 2 as being connected to the network 205, in some implementations, the one or more mobile devices 240, 250 are not connected to the network 205. In these implementations, the one or more mobile devices 240, 250 communicate directly with one or more of the control system components and no network connection, e.g., connection to the Internet, or reliance on remote servers is needed.

In some implementations the one or more mobile devices 240, 250 are used in conjunction with only local sensors and/or local devices at a property. In these implementations, the control system 200 only includes the one or more mobile devices 240, 250 and the modules 220, 222, and 230. The one or more mobile devices 240, 250 can receive data directly from the modules 220, 222, and 230 and send data directly to the modules 220, 222, and 230. The one or more mobile devices 240, 250 provide the appropriate interfaces/processing to provide control information, modify settings, control the thermostat, control HVAC system component operations, etc. In some implementations, the one or more mobile devices 240, 250 communicate directly with only the module 220 associated with the disaggregated thermostat and the module 230 associated with the sensors, and the module 220 communicates with the module 222 associated with the HVAC system components to control operation of the HVAC system associated with the property.

In some implementations, a mobile device 240, 250 is able to determine a geographic location associated with the mobile device 240, 250, and can communicate information identifying a geographic location associated with the mobile device 240, 250. For example, a mobile device 240, 250 can determine the current geographic location of the mobile device 240, 250 by using global positioning system (GPS) capabilities. In other implementations, a geographic location associated with a mobiles device 240, 250 can be determined using other methods, for example, by using Wi-Fi access point triangulation data, cellular network triangulation data, or IP address information, when the mobile device 240, 250 has network connectivity. The mobile device 240, 250 can transmit data identifying the geographic location of the mobile device 240, 250 over the network 205 to the control application server 260, or to the thermostat control unit 210.

The one or more mobile devices 240, 250 can each include a native control application 242, 252, respectively. The native control application 242, 252 refers to a software/firmware program running on the corresponding mobile devices that enables the features below. The one or more mobile devices 240, 250 can load or install the native control application 242, 252 based on data received over a network or data received from local media. The native monitoring application 242, 252 can run on mobile devices' platforms, such as Apple iOS, iPhone, iPod touch, Blackberry, Google Android, Windows Mobile, etc.

The native control application identifies a geographic location associated with the mobile device 242, 252 and communicates information identifying the geographic location. For example, a mobile device 240, 250 having the native control application 242, 252 can determine a geographic location of the mobile device 240, 250 using GPS capabilities, and can communicate data identifying the geographic location to the control application server 260. In some instances, the native control application 242, 252 can check the location of the mobile device 240, 250 periodically and can automatically detect when a user associated with the mobile device 240, 250 is going toward or away from a property.

In some implementations, the control system enables dynamic environmental control within a property by analyzing activity data, environmental data, and/or weather data, and controlling a disaggregated thermostat associated with a property's HVAC system based on the analysis. For example, the control system can enable the dynamic control of temperature and humidity within a home based on an analysis of activity data, environmental data, and/or weather data. In some instances, the activity data, environmental data, and/or weather data can be analyzed at the thermostat control unit 210 and, based on the analysis, the thermostat control unit 210 can communicate with the module 220 to control the thermostat and/or the HVAC system associated with the thermostat to dynamically control the environment within the property.

In some examples, activity data comprises data indicating the activity of users within a property as well as data indicating the activity of users external to a property. User activity within a property can be detected by one or more sensors associated with the module 230 that are associated with the property, such as one or more motion, contact, noise or other sensors capable of detecting user activity in specific parts of the property. For example, a property can be equipped with a motion sensor in each room of the property, and the control system can determine whether users are located in particular rooms of the property based on data from the motion sensors. In some instances, user activity external to a property is achieved by tracking the locations of mobile devices 240, 250 associated with users of the property. For example, the GPS coordinates of a user's mobile device can be tracked over time and analyzed to determine control of the HVAC system associated with the property. In some instances, tracking a user's mobile device can be used to determine whether the user is leaving or about to arrive at the property, and the fact that the user is leaving or about to arrive can be used to control the HVAC system associated with the property.

In some implementations, environmental data associated with the property can include both data indicating the environment within the property as well as data indicating the environment outside of the property. Environmental data, such as temperature and humidity, can be measured in each room of a property using sensors, e.g., a temperature and humidity sensor in each room. In some instances, sensors that are outside of the property can be used to obtain relevant environmental data, such as an outdoor temperature, humidity, or other data.

In some instances, the information provided by the environmental sensors can be used to generate a thermodynamic model of a property. For example, the data from the temperature and humidity sensors can be used to determine hot or cold zones within a property, or zones of the property that are more or less humid. Additionally or alternatively, a thermodynamic model of the property can indicate heat flows through a building, for example, by indicating heat flows through the rooms of a home. The generated thermodynamic model can be used to predict, for example, which rooms of the home will warm the fastest if a furnace is activated, or which rooms of the home will cool the fastest if air conditioning is used.

Weather data can include both current weather data and weather forecast data accessed at, for example, a database or website that is accessible over the network 205. For example, weather data can include current weather conditions, e.g., a current temperature and humidity in the region of the property, and/or can include forecasted weather conditions, e.g., the forecasted temperature and humidity in the region of the property for each of the next twelve hours.

In some implementations, activity data within the property is analyzed in conjunction with environmental data within the property to dynamically control the environment within the property. For example, a resident of a home can set a thermostat associated with the property to 70° F. and 50% relative humidity. Based on activity sensor data from within the home, the system can determine that the resident is sleeping in an upstairs bedroom of the home, and can access environmental data associated with the upstairs bedroom by accessing data obtained from environmental sensors in the upstairs bedroom, e.g., a temperature and humidity sensor within the bedroom. Based on the temperature sensor indicating that the temperature within the bedroom is 72° F. and the humidity sensor indicating that the humidity within the bedroom is 55% relative humidity, the system can activate an air conditioning unit and a dehumidifier of an HVAC system associated with the home to cool the home, including the upstairs bedroom, and to reduce the humidity of the home, including in the upstairs bedroom, until the targets set at the thermostat, i.e., 70° F. and 50% relative humidity, are reached in the upstairs bedroom.

In some examples, cooling the upstairs bedroom to a temperature of 70° F. can result in other, unoccupied rooms of the home cooling below the 70° F. target set by the resident of the home. In such instances, the HVAC system associated with the home can continue to operate to achieve the desired conditions in the occupied room of the home, and can disregard data indicating that other, unoccupied rooms within the home are at different temperatures and/or humidity levels from the target temperature and humidity level set by the resident.

In some instances, based on determining that a user of a property has moved from one location within a property to another location within the property, the system can determine the new location of the user and can dynamically control the environment within the property based on the new location of the user and the environment in the new location within the property. For example, the resident of the home can leave the upstairs bedroom of the home and can move to the kitchen of the home. Based on activity sensor data within the home, the system can determine that the resident is no longer present in the upstairs bedroom, and can furthermore determine that the resident is now occupying the kitchen of the home. The system can access environmental data associated with the kitchen of the home, for example, by accessing data from a temperature sensor and a humidity sensor in the kitchen of the home, and can control the HVAC system associated with the home based on the environmental data in the kitchen. For example, based on determining that the temperature within the kitchen is 68° F. and the humidity is 45%, the system can turn off an air conditioner associated with the property, can turn off a dehumidifier associated with the property, or can take another action, e.g., turning on a furnace associated with the property and/or activating a humidifier associated with the property.

In some instances, the system can determine that users of a property are occupying more than one location within the property. For example, the system can determine that there are one or more residents of a home in the kitchen of the home, and one or more residents of the home in an upstairs bedroom of the home. Based on environmental data from the multiple locations within the home, e.g., the temperature and humidity in both the kitchen and the upstairs bedroom, the system can dynamically control the HVAC system associated with the property to achieve environmental conditions close to those set by the residents of the home.

For example, if a thermostat is set to 70° F. by a resident of the home, and if the temperatures in the kitchen and the upstairs bedroom are detected as 72° F. and 71° F., respectively, the system can activate an air conditioning unit associated with the property to cool the property and achieve temperatures in the occupied rooms that are closer to the 70° F. target set by the resident. In some instances, the system can average the temperatures and/or other environmental metrics, e.g., humidity, in the areas of the property occupied by users of the property, and can control an HVAC system associated with the property based on the average temperatures and/or other metrics. For example, if the thermostat is set to 70° F. and the temperatures of the occupied kitchen and the occupied upstairs bedroom are 76° F. and 68° F., respectively, the system can determine that the average temperature of the two occupied rooms is 72° F., and can control the HVAC system associated with the property to operate an air conditioner to adjust the environment within the property to achieve an average temperature that matches the 70° F. target.

In some implementations, the system can determine a number of individuals that are occupying each of the one or more locations within the property, and can control the HVAC system associated with the property based on the number of individuals occupying each location. In some instances, the system can determine the temperatures and/or other environmental metrics for each of the occupied locations and can use the number of individuals occupying each location to determine operation of the HVAC system associated with the property. For example, the number of individuals occupying each location can be used to determine a weighting factor for each location, and control of the HVAC system can be based on the determined temperatures and/or other environmental metrics and the weighting factors. For example, a thermostat of a property can be set to 70° F., the temperature of a kitchen of the property occupied by three individuals can be 76° F., and the temperature of an upstairs bedroom of the property occupied by one individual can be 68° F. Based on three out of the four individuals occupying the kitchen and one out of the four individuals occupying the upstairs, bedroom, the system can determine a weighted average temperature of 74° F., i.e., (76° F.)(¾ of individuals)+(68° F.)(¼ of individuals)=74° F., and can control the HVAC system of the property based on the weighted average temperature.

For instances in which a property is configured to operate a single HVAC system associated with the property, controlling the HVAC system based on temperatures and/or other environmental conditions in one or more occupied locations of the property can affect temperatures and/or other environmental conditions in other occupied or unoccupied locations of the property. For example, based on a thermostat associated with the property's HVAC system being set to 70° F. and the system determining an average temperature of occupied locations at the property being 72° F., the system can activate an air conditioning unit to cool the occupied locations such that the average temperature of the occupied locations reaches the target 70° F. temperature. In doing so, the temperatures of occupied and unoccupied temperatures can be permitted to deviate further from the target 70° F. temperature. For example, a cold zone of the property associated with the basement of the property and having a temperature before the air conditioner is activated of 64° F. can have a temperature after the air conditioner is activated that is further from the target 70° F. temperature, for example, a cooler temperature of 62° F. Based on the cold zone of the property associated with the basement not being occupied, the system can allow the temperature of the basement to continue to cool below the 70° F. target temperature.

In some implementations, activity data within a property can be used to determine activity patterns for the property that can be used to control the property's HVAC system. For example, the system can track activity within the property over a period of time, and based on the activity can determine one or more patterns that can be used to control the HVAC system to maintain a target temperature or other environmental conditions at locations of the property that are or are likely to be occupied.

For example, activity patterns can identify a time when particular locations of the property are likely to be occupied, and the system can control the HVAC system of the property based on temperature and other environmental data received from the locations that are expected to be occupied. For example, an activity pattern can indicate that a family room of a home is typically occupied from 4:00 PM to 6:00 PM on any given day, and that a kitchen of the home is typically occupied from 6:00 PM to 7:00 PM on any given day. Based on expectations that the family room is likely to be occupied beginning at 4:00 PM and that the kitchen is likely to be occupied beginning at 6:00 PM, the system can control the HVAC system of the home such that a target temperature indicated at a thermostat of the home is achieved in the family room at 4:00 PM and that the target temperature is achieved in the kitchen at 6:00 PM.

In some instances, controlling the HVAC system such that a target temperature is achieved in a particular location of the property at a target time of day can include identifying the particular location as the occupied location prior to the time of day. For example, based on an activity profile associated with the property indicating that the family room will be occupied beginning at 4:00 PM, the system can identify the family room as being occupied beginning at 3:45 PM. By identifying the family room as occupied prior to the time when the family room is actually occupied, the HVAC system can begin adjust the temperature of the family room to the target temperature prior to anyone occupying the room.

In some instances, controlling the HVAC system such that a target temperature is achieved in a particular location of the property at a target time of day can involve including the particular location in a set of occupied locations prior to the location being occupied. For example, based on determining that a bedroom of a home is occupied at 3:45 PM, and based on an activity profile for the home indicating that the family room is typically occupied beginning at 4:00 PM, the system can identify that both the bedroom and the family room are occupied beginning at 3:45 PM. The system can then control the HVAC system associated with the property based on both the bedroom and the family room being occupied, for example, by controlling the HVAC based on an average of the temperatures in both the bedroom and the family room.

In practice, changing the location or locations of a property identified as occupied based on an activity profile, and controlling the property's HVAC system based on the changes in the identified location or locations, can cause temperatures or other environmental conditions of locations that are actually occupied by individuals to diverge from the target temperature or environmental conditions. For example, a target temperature of 70° F. can exist in an occupied bedroom of a home prior to 3:45 PM, i.e., the bedroom's temperature can be 70° F. and match the target temperature of 70° F. indicated at a thermostat of the home. Based on identifying a family room of the home with a temperature of 72° F. as being likely to be occupied soon at 3:45 PM, i.e., according to an activity profile indicating that the property is typically occupied beginning at 4:00 PM, the system can control the HVAC system to activate an air conditioning unit to cool the family room to the target temperature of 70° F. In activating the air conditioning unit, the system can permit the temperature of the occupied bedroom to diverge from the 70° F. target temperature in anticipation of the family room of the home being occupied fifteen minutes later at 4:00 PM.

In some implementations, the system can monitor activity at the various locations of the property to determine whether locations that are typically occupied at certain times are actually occupied during the times indicated by the activity profile. Based on determining whether the locations that are typically occupied during certain times are actually occupied during those times, the system can control the HVAC system of the property. For example, based on a target temperature set at a thermostat being 70° F. and based on an activity profile for a home indicating that a kitchen of the home is typically occupied at 6:00 PM, the system can make a determination at 5:45 PM that the temperature in the kitchen is 74° F. and can activate an air conditioning unit to cool the kitchen prior to 6:00 PM. Based on determining at or after 6:00 PM that the kitchen of the home is not occupied, however, the system can control the property's HVAC system based on locations of the property that are actually occupied at that time.

In some examples, residents of a home can identify two or more settings for the environment of the property. For example, a resident at the home can use the thermostat to identify a first set temperature for the property when one or more residents are present at the property, and a second, different set temperature for the property when none of the residents are present at the property. In some instances, the two or more settings for the environment of the property can include a "home" setting, wherein the temperature and other environmental conditions set by the users is aimed at achieving comfort for the users of the property while they are present in the property, and an "economy" setting, wherein the temperature and other environmental conditions set by the users are aimed at achieving more energy efficient operation of the properties HVAC system.

In some implementations, based on activity data obtained by the system, the system can elect one of the settings, e.g., a "home" or "economy" setting, by which to operate. For example, the system can control the HVAC system associated with a home to achieve environmental conditions set in a "home" setting based on the system detecting the presence of residents in one or more locations of the property, and the system can control the HVAC system to achieve environmental conditions set in an "economy" setting based on the system detecting that there are no residents occupying the property.

In some implementations, dynamically controlling the environment within a property can include accessing environmental sensor data external to the property and utilizing the external environmental data to determine control of an HVAC system associated with the property. For example, sensors can determine environmental conditions in an occupied location within the property as well as environmental conditions external to the property, and can use both sets of sensor data to determine operation of the HVAC system. For instance, based on a resident of a home setting a desired temperature to be 70° F., the system may determine that the temperature of an upstairs bedroom that the resident is occupying currently has a temperature of 72° F. and can furthermore determine that an outdoor temperature at the property is 68° F. Based on determining that the temperature outside of the home is cooler than the temperature inside of the upstairs bedroom, the system may forgo activating an air conditioning unit of the home, in order to save energy used by the air conditioner, and can instead wait until the bedroom naturally cools to the desired temperature. Additionally or alternatively, the system may forgo activating the air conditioning unit of the home, and instead may activate an internal circulation fan and/or activate external air ventilation using a fan to cool the bedroom more quickly than letting the bedroom naturally cool, while using less energy than if the air conditioning unit were activated.

Additionally or alternatively, in some instances, the system can track outdoor environmental conditions to determine operation of an HVAC system associated with a property. For example, based on a resident of a home using a thermostat to set a desired temperature to 70° F. within the home, and based on determining that the temperature of an upstairs bedroom that the resident is occupying has a temperature of 72° F., the system can access external temperature data to determine the temperature outside of the property. The system might determine that the outside temperature is 74° F., but that the outside temperature has been decreasing over the past 3 hours. Based on determining that the temperature outside is decreasing at a rate such that the outside temperature will reach the desired temperature within a threshold period of time, etc., the system can determine whether to activate an air conditioning unit associated with the home.

In some implementations, a profile for a property can be generated that includes information identifying the extent to which outdoor environmental conditions affect temperature and/or other environmental conditions at various locations of the property. The system can control the HVAC system associated with the property based on the generated profile and other information relating to the property, e.g., environmental conditions within the property, activity within the property, an activity profile for the property, etc. For example, a profile associated with the property can indicate that the environments of various locations of the property are more or less affected by outdoor conditions at the property, and the system can control the HVAC system based on the profile indicating that particular locations within the property are more or less affected by the outdoor conditions.

For example, a profile can indicate that a basement of a home is less affected by outdoor environmental conditions than an upstairs bedroom of the home. Using the profile, the system can control the HVAC system differently depending on whether the basement or the upstairs bedroom of the home is occupied, and based further on the environmental conditions in the occupied location and the environmental conditions outside of the home. For example, if the occupied basement has a temperature of 68° F., and if the target temperature is 70° F. with an outdoor temperature of 80° F., the system may control the HVAC to turn off all heating and air conditions units, with an expectation that the temperature in the basement will slowly warm to a temperature near the target 70° F. In another example, if the upstairs bedroom is occupied at a temperature of 68° F., and if the target temperature is 70° F. with an outdoor temperature of 80° F., the system may control the HVAC system to activate an air conditioning unit to ensure that the temperature in the bedroom does not rise well above the 70° F. target, since the profile indicates that the upstairs bedroom is easily affected by outdoor environmental conditions.

In some instances, the locations of users external to the property can be used to dynamically control the environment within the property. As discussed, the locations of users external to the property can be identified based on the geographic locations of mobile devices 240, 250 associated with the users of the property. For example, the system can dynamically control the environment of a home based on the locations of mobile devices 240, 250 associated with residents of the home.

In some instances, the locations of mobile devices 240, 250 associated with users of the property can be used to determine an operating mode, or setting, of an HVAC system associated with a property. For example, the system can determine that a resident of a home is travelling away from the home based on tracking the geographic location of a mobile device associated with the resident, and based on determining that the resident is leaving the home, can elect an "economy" setting by which to operate the HVAC system associated with the home. By determining to operate using an "economy" setting, the system can reduce the energy consumption of an HVAC system in comparison to operating in a "home" mode. For example, during a hot summer, a resident of a home can set a "home" temperature at a thermostat of the home to 70° F. and an "economy" temperature to 75° F. Based on determining that the resident of the home is travelling away from the home, e.g., going to work in the morning, the system can elect to change operation from the "home" setting to the "economy" setting. In another example, based on determining that the resident of the home is travelling towards the home, e.g., returning home from work, the system can elect to switch operation from the "economy" setting to the "home" setting, for example, to cool the home from 75° F. to 70° F. before the resident returns. In doing so, the comfort of the resident can be maintained while they are at the home, while reducing the total daily energy consumption of the HVAC system associated with the home.

In some instances, the locations of mobile devices 240, 250 associated with users of a property can be used to determine particular locations within the property that are likely to be occupied by users of the property within a foreseeable period of time. For example, the system can determine that mobile devices 240, 250 being in a particular location and travelling towards a home will likely result in the users of the mobile devices 240, 250 occupying a particular room or rooms of the home once they arrive. In some instances, the system can identify different locations that are likely to be occupied based on the locations of the mobile devices 240, 250. In some examples, the system can also associate an anticipated number of occupants and/or multiple rooms that are likely to be occupied based on the detected locations of the mobile devices 240, 250.

For example, the system can determine that when a particular user returns home from their office, they typically will occupy the kitchen of the home. Based on determining that a mobile device 240, 250 associated with a user is at a location corresponding to the user's office and moving towards the user's home, the system can control the HVAC system associated with the home to achieve a target temperature in the kitchen of the home, for example, a target temperature that has been set at a thermostat of the home. In another example, the system can determine that when a particular user returns home from a school, that the user will typically return with multiple individuals, e.g., the user and one or more children that attend the school, and will typically occupy the family room and the upstairs bedroom of the home. Based on determining that a mobile device 240, 250 associated with the user is at a location corresponding to the school and moving towards the user's home, the system can control the HVAC system associated with the home to achieve a target temperature in the family room and/or upstairs bedroom of the home, the target temperature being set at a thermostat of the home.

In some implementations, weather data can be obtained and used in controlling the operation of an HVAC system associated with a property. For example, a control system associated with an HVAC system for a home can determine its operation based on current weather data and/or weather forecast data for the region of the home. In some instances, the weather data can be weather data accessed at a database or on a website accessed on the Internet, for example, using one or more networks 205.

In some examples, the weather data is used to determine an operating schedule for an HVAC system associated with the property. For example, a resident of a home can set a desired temperature for their home using a thermostat associated with the home, and the system can determine an operating schedule for the HVAC system associated with the home based on weather data that indicates current or future weather conditions in the region of the home. For example, if the resident sets a desired temperature to 70° F., the system may access weather data for the upcoming week and can determine that, while the weather will be in the range of 80-85° F. during the early part of the week, the temperature will be at or slightly below 70° F. during the latter part of the week. Based on the weather data, the system can establish an operating schedule for the HVAC system, for example, in which an air conditioning component of the HVAC system will operate during the early part of the week to keep the temperature of the home at the user-desired temperature, and in which the air conditioning component of the HVAC system will not operate during the latter part of the week to increase the energy efficiency of the overall HVAC system operation. While discussed herein in terms of a schedule for operation of the HVAC system over the course of a week, similar techniques can be adapted to shorter operating schedules of the HVAC system, for example, operating schedules for the HVAC system that span only several hours after receiving weather data.

In some examples, a profile for a property can be generated that includes information identifying an extent to which outdoor environmental conditions affect environmental conditions at various locations of the property, and weather forecast data may be used in conjunction with the profile to control the HVAC system associated with the property. The system can control the HVAC system associated with the property based on the generated profile, the weather forecast data, and other information relating to the property, e.g., environmental conditions within the property, activity within the property, an activity profile for the property, etc. For example, a profile associated with the property can indicate that the environments of various locations of the property are more or less affected by outdoor conditions at the property, and the system can control the HVAC system based on the profile indicating that particular locations within the property are more or less affected by the outdoor conditions and the forecasted weather conditions. In some examples, controlling the HVAC system based on the profile and the weather forecast data can reduce energy usage by the property's HVAC system by limiting energy usage when weather forecasts indicate that likely future outdoor environmental conditions will be conducive to achieving target environmental conditions within the property.

For example, a profile can indicate that an upstairs bedroom of a home is easily affected by outdoor environmental conditions. At a particular time when the bedroom is occupied, the temperature in the bedroom may be several degrees above a target temperature. For example, the temperature in the upstairs bedroom may be 74° F., with a target temperature indicated at a thermostat being 70° F. Based on accessing weather forecast data indicating that temperatures in the region of the property are likely to decrease to 65° F. within a short period of time, and based on the profile indicating that the upstairs bedroom is easily affected by outdoor environmental conditions, the system may forgo activating an air conditioning unit of the property's HVAC system and instead may allow the upstairs bedroom to cool naturally due to changes in outdoor temperature. By forgoing the use of the air conditioning unit, the energy usage of the property's HVAC system can be reduced. In another example, a basement of the home can be occupied and a profile can indicate that the basement is not considerably affected by outdoor environmental conditions. Based on the temperature in the basement being 74° F. and the target temperature indicated at a thermostat being 70° F., the system may activate an air conditioning unit associated with the home's HVAC system despite weather forecasts indicating that the outdoor temperature will decrease to 65° F. within a short period of time, based on the basement of the home not being easily affected by changes in outdoor weather conditions.

In some implementations, a single property can be equipped with multiple independently operating HVAC systems or subsystems, and the analyzing of the activity data, environmental data, and/or weather data can enable the system to independently operate the multiple HVAC systems or subsystems. For example, a particular property can have two air conditioning units that cool different areas of a particular property. Based on determining that users of the property are occupying only a particular location within the property, and based on determining that the temperature within the particular location within the property exceeds a preferred temperature selected by the users, the system can control the air conditioning units such that only the air conditioning unit responsible for cooling the occupied location within the property is active to cool the particular location within the property. While explained herein in reference to the operation of a multiple air conditioning unit HVAC system, similar techniques can be applied to HVAC systems featuring one or more furnaces, multiple or programmable ventilation systems, systems featuring one or more humidifiers or dehumidifiers, etc.

In some instances, the control of an HVAC system associated with a property can be achieved externally by individuals other than users of the property, for example, by a professional HVAC system monitoring service. In some implementations, control of the HVAC system can be achieved by users that are able to control the HVAC system externally over one or more networks 205 associated with the control system. For example, a professional HVAC system monitoring service can access information and/or control the operation of an HVAC system through a web-based interface or other interface that connects to the control system associated with the property. In some instances, enabling external control or accessing of data related to the control system by individuals other than the users of the property can enable performance monitoring or maintenance monitoring of the control system and its associated HVAC system. In practice, accessing the control system over one or more networks 205 can be used to achieve other control functions of the HVAC system associated with the property.

In some implementations, the control system can use information such as HVAC system performance, energy efficiency, maintenance, or other information to detect errors or faults in the HVAC system. Based on detecting an error, the control system can report the error, for example, to an HVAC system monitoring service, or other user associated with the property. In some instances, the error can be reported at a display of an HVAC system component, e.g., a thermostat, or can be reported at a web or mobile-based application, for example, based on the data identifying the error being accessible over one or more networks 205.

For example, an air compressor of an HVAC system might report that it has a below average output air flow corresponding to a potential clog in the compressor and, in response, the air compressor may be turned off. In this case, the control system may additionally broadcast an error message to users indicating that the air compressor was turned off due to the potential clog. In another example, a fault relating to an air conditioner may cause the air conditioner to run continuously without achieving a target temperature in a room of a home. A first error may be reported by the thermostat control unit 210 indicating that the target temperature in the room has not been achieved despite the air conditioner being active. A second error may be reported based on temperature sensors within the room of the home indicating that the temperature within the room has not reached the target temperature within a sixty minute period, when a typical time to reach the target temperature is forty minutes. Still a third error may be reported based on determining that the HVAC system is consuming 4.0 kWh of energy per hour when typical energy consumption levels are 2.5 kWh of energy per hour. Thus, error and fault detection can utilize robust and redundant methods to accurately report errors, and can monitor the entire home and HVAC system as opposed to only individual HVAC system components.

In some implementations, error messages and other information can be provided at a display of a component of an HVAC system, such as at an interface of a control or alarm panel of the HVAC system, a thermostat of the HVAC system, or another component. In some implementations, the display can be an electrophoretic ink (E Ink) display, such as those provided by E Ink Corporation, or any other bi-stable, high contrast, low power display. In some implementations, the display can be a light emitting diode (LED) display, for example, an LED matrix display, can be a liquid crystal display (LCD), can be a plasma display, or can be a display that uses other technologies. The display can output information relating to the configuration or control of the HVAC system, where integration of the electrophoretic ink display can enable the display to output detailed information while maintaining readability.

In some implementations, such a display can be dynamic in that it enables users to determine information that is and is not presented at the display. For example, a user can interact with a display to specify information that can be provided for output at the display. Information not output at the display can be viewable at another interface, such as by accessing a web or mobile-based application at the mobile devices 240, 250. By enabling the end user to customize the display, the display is not burdened with displaying complex graphics or information, since such information would be accessible elsewhere. For example, an exhaustive operating schedule associated with an HVAC system may not be output at a display if such information is accessible and more easily viewed using an application on a mobile device 240, 250.

Figure 3:
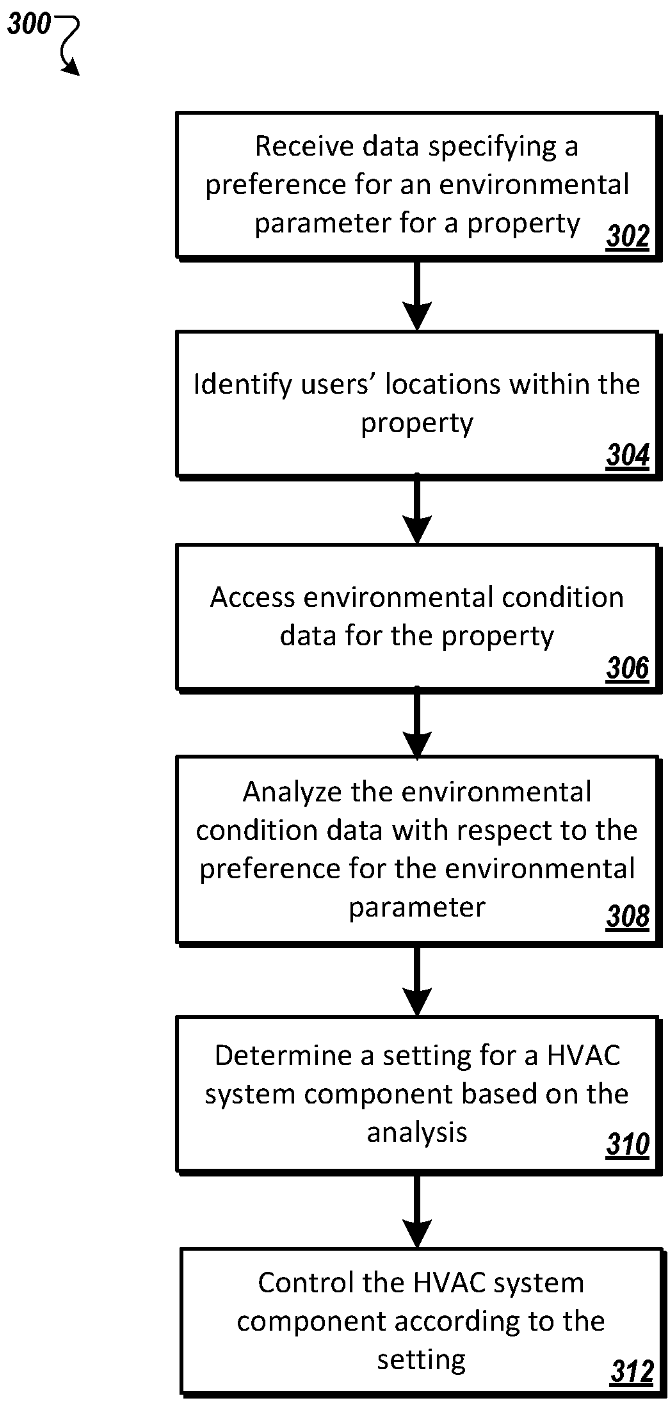
FIG. 3 illustrates a flow chart of an example process.

FIG. 3 illustrates an example process 300 for controlling one or more components of an HVAC system associated with a property, based on information accessible to a disaggregated thermostat. In some examples, the process 300 of FIG. 3 is performed by the system 200 of FIG. 2. While described hereafter in a specific order, the operations of the process 300 may be completed in any order that enables the disaggregated thermostat to control the one or more components of the HVAC system based on the accessed data, including the accessed environmental data for the property, activity data for the property, user preferences relating to environmental parameters for the property, and other data.

Data is received that specifies a preference relating to an environmental parameter for a property (302). For example, a user of a property may provide input at an interface of the disaggregated thermostat or at an application associated with the disaggregated thermostat that sets a preference for an environmental parameter, such as a target temperature or humidity within the property. The disaggregated thermostat may receive the data specifying the preference. In some implementations, the disaggregated thermostat may determine the preference for the environmental condition based on other factors. For example, a user may set a "comfort" setting for the property that indicates a target temperature of 70° F. when the user is at the property, and an "economy" setting for the property that indicates a target temperature of 75° F. when the user is not at the property.

The disaggregated thermostat can identify the locations of one or more users within the property (304). For example, the disaggregated thermostat may be associated with, or be in communication with, one or more sensors that are capable of detecting conditions indicative of user presence. As an example, each room of a property may have a sensor that is capable of determining whether a user is present, such as a motion sensor, knock sensor, noise sensor, or other sensor that can determine whether a user is likely present in that room. The disaggregated thermostat can receive information from the sensors and can identify the locations of users within the property based on the received information, for example, by identifying rooms of the property where users are likely located. In some instances, the sensors used to detect the presence of users at various locations in the property are associated with a monitoring system that is in communication with the disaggregated thermostat, where the monitoring system is capable of determining the locations of users at the property and performing other operations related to monitoring the property. In these implementations, the disaggregated thermostat can receive the information indicating the determined locations of users within the property from the monitoring system.

Data indicating the condition of one or more environmental parameters is accessed (306). For example, the disaggregated thermostat can receive environmental condition data from one or more sensors that are capable of detecting the condition of one or more environmental parameters at various locations throughout the property. Each sensor may be capable of detecting the condition of one or more environmental parameters, such as a temperature, humidity, wind speed, etc., at the location of the sensor. The property may have one or more such sensors, for example, in each room or zone of a property, and the disaggregated thermostat can access the environmental data obtained by the sensors. In some implementations, the disaggregated thermostat only accesses the environmental data (e.g., the data that indicates the condition of the one or more environmental parameters) for those rooms or zones of the property that are determined to be occupied by users. In other implementations, the disaggregated thermostat accesses the environmental condition data for all or a subset of the rooms or zones of the property, regardless of whether those rooms or zones are identified as being occupied.

Based on receiving the preferences for the one or more environmental parameters, identifying the locations of users within the property, and accessing the environmental condition data for the property, an analysis of the environmental condition data with respect to the preferences for the environmental parameters is performed (308). Specifically, the disaggregated thermostat may compare the condition of the environmental parameter at one or more occupied locations of the property to the preference for the environmental parameter. As an example, the disaggregated thermostat may receive data indicating a preferred temperature for a property, such as 70° F., and may determine that a temperature in an occupied room of the property is above the preferred temperature, for example, that temperature in the occupied room of the property is 72° F.

In some instances, more than one room or zone of a property may be occupied by users, and the disaggregated thermostat may analyze the environmental condition data with respect to the preference relating to the environmental parameter. For instance, the disaggregated thermostat may compare the preference for the environmental parameter to the condition of the environmental parameter in each of the occupied rooms or zones of the property, compare the preference for the environmental parameter to an average of the condition of the environmental parameter in each of the occupied rooms or zones, or otherwise analyze the condition of the environmental parameter in the one or more occupied rooms or zones with respect to the preference relating to the environmental condition. For example, based on determining that a first room of a property is occupied by one or more users and has a temperature of 70° F. and a second room of the property is occupied by one or more users and has a temperature of 72° F., an average temperature of 71° F. for the two rooms may be compared to a 70° F. preferred temperature for the property.

In some instances, analysis of the environmental condition data for the one or more occupied rooms with respect to the preference relating to the environmental parameter may be dependent on the number of users occupying each of the occupied rooms. For example, the sensors of a monitoring system in communication with the disaggregated thermostat may be capable of determining the number of users in each of the occupied rooms of a property, and analysis of the environmental condition data with respect to the preference relating to the environmental parameter may involve comparing the preference for the environmental condition to a weighted average condition for the environmental parameter. In such an implementation, the weighted average may be weighted based on the number of occupants in each room (e.g., such that rooms with more occupants are given a stronger weight).

Based on analyzing the environmental condition data with respect to the preference relating to the environmental parameter, a setting for an HVAC system component can be determined (310). Generally, the disaggregated thermostat can determine a setting for one or more components of an HVAC system associated with a property that will cause the one or more HVAC system components to adjust the condition of the environmental parameter at the occupied locations of the property towards a preference for the environmental parameter. For example, based on comparing the temperature of an occupied room of a property to a preferred temperature for the property, the disaggregated thermostat can determine how to control an air conditioner that is included in the HVAC system associated with the property. For instance, based on determining that the temperature in an occupied room of a property is 72° F. and is above a preferred temperature of 70° F., the HVAC system can determine that an air conditioner should be turned on to cool the occupied room of the property toward the 70° F. target. In some implementations, determining a setting for an HVAC system component can involve determining whether the component should be turned on or off, determining a fan speed or other power setting for the component (e.g., whether an air conditioner or fan should be set to a low or high setting), etc.

In some implementations, the disaggregated thermostat can determine to control the HVAC system component to adjust the condition of the environmental parameter towards the preferred condition for the environmental parameter at the occupied locations of the property, despite such control causing the condition of the environmental parameter at other locations to diverge further from the preferred condition. For example, if an occupied room of a property has a temperature of 72° F. that is above a preferred temperature of 70° F., the disaggregated thermostat may turn on an air conditioner associated with the property, despite the fact that turning on the air conditioner will cause the temperature in another room of the property (e.g., an unoccupied room) that has a temperature of 68° F. to cool further, thus causing the other room to have a temperature that is further from the preferred temperature.

Based on determining a setting for one or more HVAC system components, the one or more HVAC system components can be controlled according to the determined setting. For example, based on comparing the temperature in an occupied room of a property to a preferred temperature for the property and subsequently determining that an air conditioner associated with the property should be turned on, the disaggregated thermostat can control the air conditioner by turning on the air conditioner.

Figure 4A:
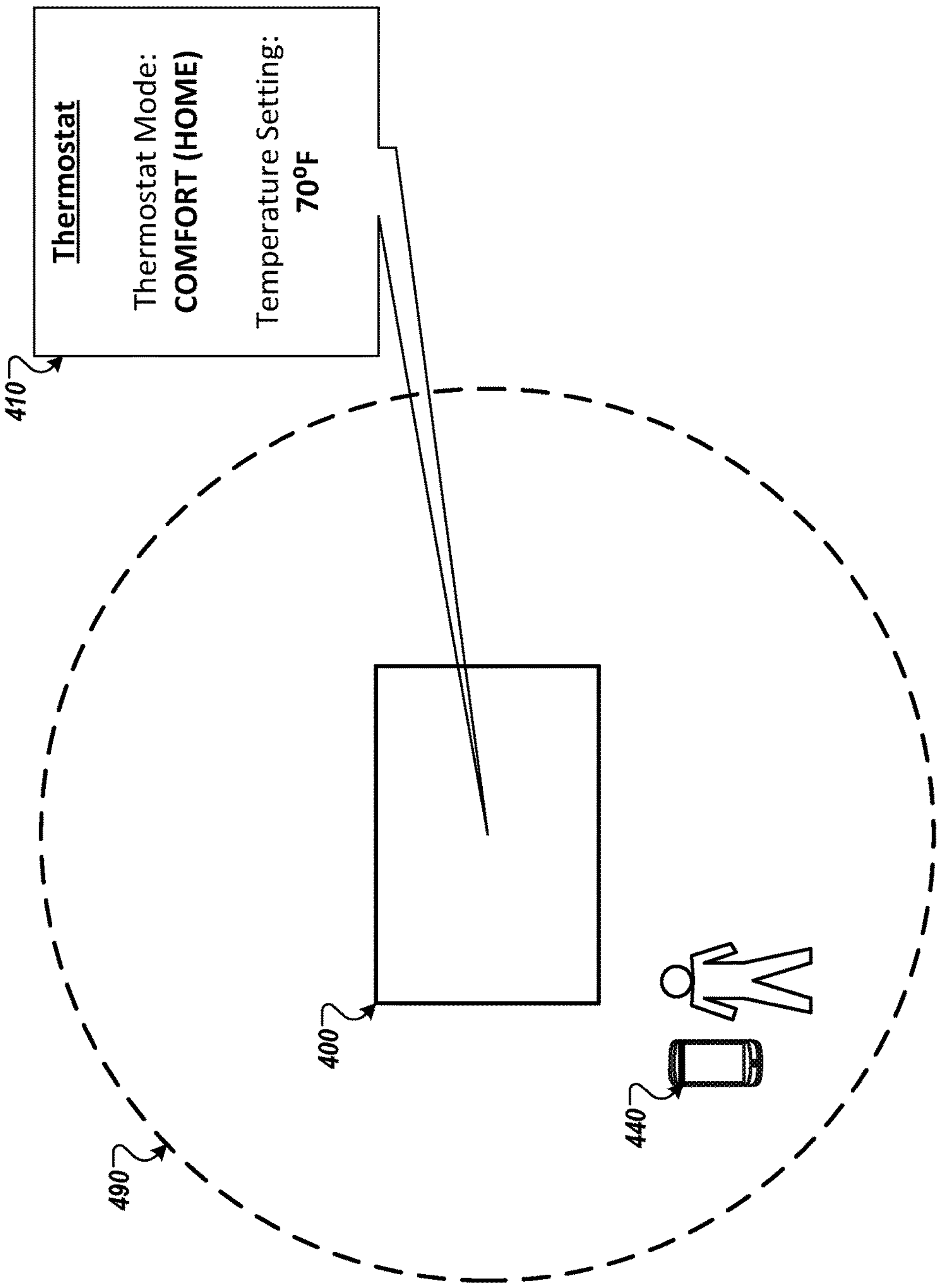
FIGS. 4A-4B illustrate an example of controlling an HVAC system based on the locations of users of a property associated with the HVAC system.
Figure 4B:
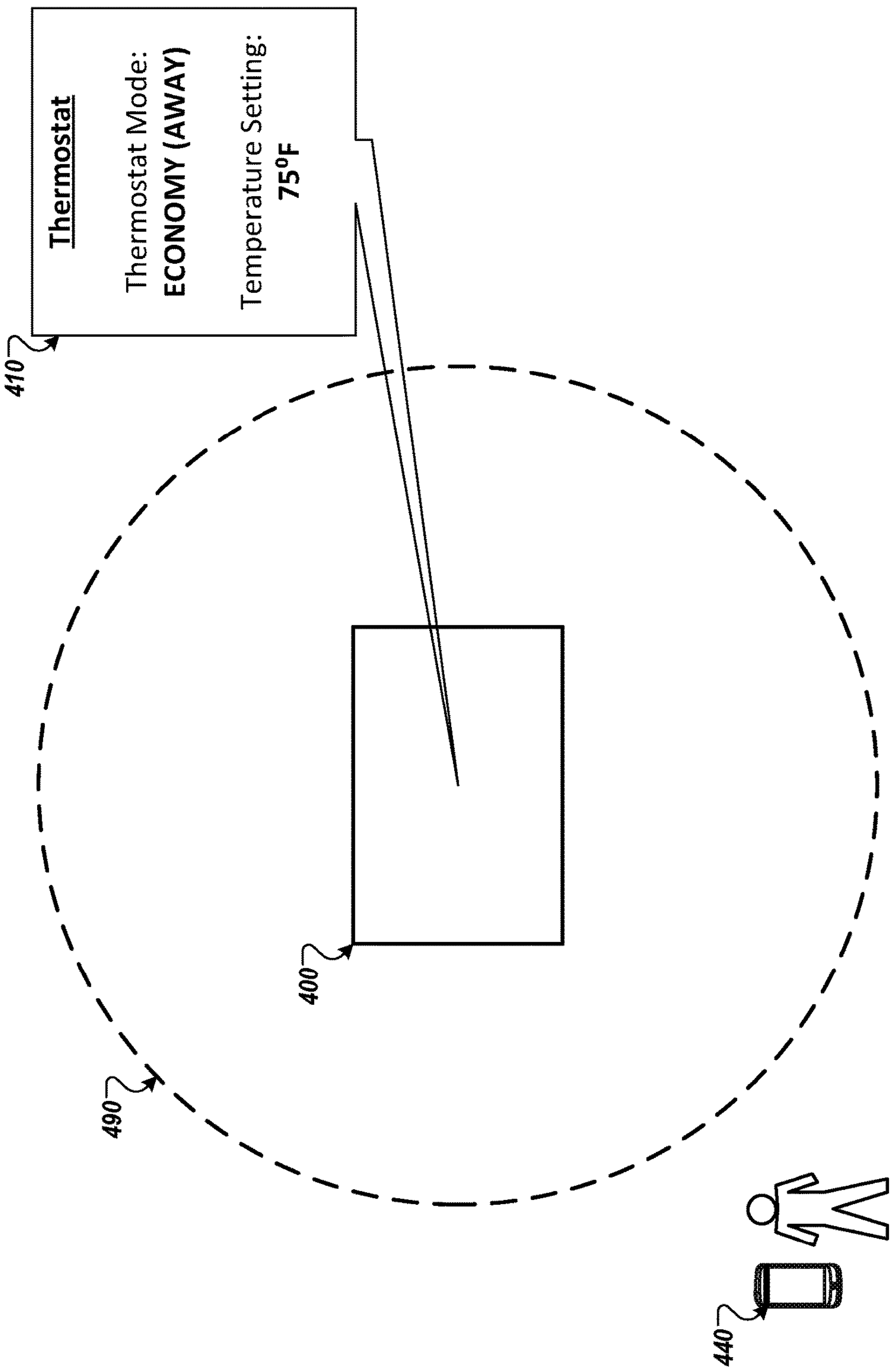

FIGS. 4A and 4B illustrate examples in which the control of an HVAC system associated with a property may be influenced by the presence of users at or near the property. In some implementations, the example illustrated in FIGS. 4A and 4B is performed by the system 200 of FIG. 2. For example, the system of FIG. 4A can include a disaggregated thermostat 410 that is associated with a property 400. The disaggregated thermostat 410 can be associated with one or more sensors that are capable of determining the condition of one or more environmental parameters at the property 400, and can also be associated with one or more sensors that are capable of detecting the presence of one or more users at the property 400. A user associated with the property 400 can be equipped with a client device 440 that is capable of determining a geographical location of the client device 440, for example, by using GPS, by determining a location associated with a WiFi, cellular, or other network to which the client device 440 is connected, or by using other methods. The client device 440 may be in communication with the disaggregated thermostat 410 such that the disaggregated thermostat 410 can receive data indicating the geographic location of the client device 440 or the proximity of the client device 440 to the property 400. In some implementations, the client device 440 is associated with a native application that can enable communication between the client device 440 and the disaggregated thermostat 410, for example, by enabling the client device 440 to transmit information that identifies the location of the client device 440 to the disaggregated thermostat 410.

The disaggregated thermostat 410 can recognize two or more different sets of preferences relating to environmental parameters at the property. For example, the disaggregated thermostat 410 may receive data that identifies a "comfort" setting that specifies preferences relating to one or more environmental parameters for times when users of the property 400 are located at or near the property. As an example, the "comfort" setting may specify that, when users of the property 400 are determined to be located at the property 400, or within a threshold distance of the property 400, an HVAC system associated with the property 400 should be controlled to achieve the environmental conditions specified by the "comfort" setting, e.g., a temperature of 70° F. and a relative humidity of 50%. Additionally, the disaggregated thermostat 410 may be able to access data that identifies an "economy" setting that specifies preferences relating to the one or more environmental parameters at times when users of the property 400 are not located at the property, or are not within a threshold distance of the property. As an example, the "economy" setting may specify that, when users of the property 400 are determined to be located away from the property 400, or outside of a threshold distance from the property 400, the HVAC system associated with the property 400 should be controlled to achieve the environmental conditions specified by the "economy" setting, e.g., a temperature of 75° F. and a relative humidity of 30%. In some instances, the "comfort" and "economy" settings may be set by a user associated with the property 400 such that the "comfort" setting specifies the user's preferred environment within the property 400 while the user is located at the property 400, and the "economy" setting specifies preferences for the environment within the property 400 while the user is away from the property 400, for example, such that the "economy" settings are settings that cause the HVAC system to use less energy.

In the example shown in FIG. 4A, a user of the property 400 has defined a "comfort" setting in which the preferred temperature within the property 400 is set to 70° F. The disaggregated thermostat 410 may utilize the "comfort" setting when one or more users are determined to be inside of the property 400, for example, based on one or more motion sensors associated with the disaggregated thermostat 410 detecting the presence of the user within the property 400, or based on the disaggregated thermostat 410 receiving information that indicates that a client device 440 associated with the user is within a threshold distance 490 of the property 400. For example, the disaggregated thermostat can receive GPS data from the client device 440 that indicates a location of the client device 440, and based on the GPS data the disaggregated thermostat can determine that the client device 440 is within a threshold distance 490 (e.g., a one mile radius) from the property 400. Based on determining that one or more users are located within the property 400 or that the client device 440 associated with the user is within the threshold distance 490 from the property 400, the disaggregated thermostat 410 can control the HVAC system associated with the property 400 according to the "comfort" setting. For example, the disaggregated thermostat 410 can determine the temperature and relative humidity in rooms of the property 400 that are identified as being occupied, or can determine an average temperature in the different rooms of the property 400. The disaggregated thermostat 410 can determine how to control the HVAC system associated with the property 400 based on a comparison of the temperature and relative humidity in the property 400 (e.g., the temperature and relative humidity in the occupied rooms of the property 400 or the average temperature and relative humidity in all of the rooms of the property 400) to the temperature and relative humidity settings specified by the "comfort" setting.

Additionally, in some implementations, based on the disaggregated thermostat 410 determining that one or more users have entered the property 400 and/or are within the threshold distance 490 of the property 400, the disaggregated thermostat 410 can identify one or more rooms or zones of the property 400 that are likely to be occupied by the one or more users. For example, as described, the disaggregated thermostat 410 may be able to access an activity pattern associated with the property 400 or one or more users of the property 400 that indicates rooms or zones of the property 400 that are frequently occupied by users of the property 400 at particular times of day. Based on determining that one or more users are within, near, or are approaching the property 400 at a particular time of day, the disaggregated thermostat 410 can identify one or more rooms or zones of the property 400 that are frequently occupied at that time. The disaggregated thermostat 410 can determine the condition of one or more environmental parameters within the identified rooms or zones, and can control one or more HVAC system components to adjust the condition of the one or more environmental parameters towards the preferences indicated by the "comfort" setting.

In some implementations, the disaggregated thermostat 410 may be able to identify one or more particular users that are located within, near, or that are approaching the property 400. For example, the disaggregated thermostat 410 may receive information identifying a particular user that is located within or near the property 400 that has been identified based on image (e.g., facial) recognition performed by one or more sensors of a monitoring system associated with the disaggregated thermostat 410. In other examples, a particular user may be identified based on a credential that the user has submitted at the property 400, for example, based on determining that user has entered the property by unlocking a door using a particular key, fob, access card, etc. In other examples, a particular user may be identified based on determining that a particular client device 440 belonging to the particular user is located within, near, or is approaching the property 400. Based on identifying one or more of the users within or near the property 400, the disaggregated thermostat 410 can access an activity profile for the particular user or for the property to determine one or more locations within the property 400 where the particular user is likely to be located. For example, the disaggregated thermostat 410 can determine that a first user who is approaching the property 400 typically goes to the kitchen of the property 400 when they arrive. Based on determining that the first user is approaching, the disaggregated thermostat 410 can determine the condition of one or more environmental parameters in the kitchen of the property 400, and can control one or more HVAC system components to adjust the condition of the environmental parameters towards the preferences identified by the "comfort" setting. Based on determining that a second, different user is approaching the property 400 who typically goes to a basement of the property 400 when they arrive, the disaggregated thermostat 410 can control one or more HVAC system components to adjust the condition of the environmental parameters in the basement of the property 400 towards the preferences identified by the "comfort" setting.

Additionally, in some implementations, the disaggregated thermostat 410 may determine that one or more users are present at the property 400, and that one or more other users are approaching the property 400 (e.g., are within the threshold distance 490 of the property). Based on the one or more users being located within the property, the disaggregated thermostat 410 may control an HVAC system associated with the property to achieve a condition of one or more environmental parameters that match the preferences identified by the "comfort" setting in the rooms or zones of the property 400 where the users are located. Based on determining that the one or more other users are approaching the property 400, the disaggregated thermostat 410 may access activity profiles for the property 400 and/or the one or more users to determine rooms or zones of the property where the one or more users are likely to go to when they arrive. The disaggregated thermostat can then begin to control the HVAC system to achieve environmental conditions within the rooms or zones of the property 400 where the one or more arriving users are likely to go when they arrive. In some implementations, since there are already one or more other users in other rooms or zones of the property 400, the disaggregated thermostat 410 may determine to control the HVAC system to adjust the condition of one or more environmental parameters in both the occupied rooms or zones of the property and the rooms or zones of the property that are likely to be occupied by the arriving users, in order to adjust the environmental parameters towards the preferences identified by the "comfort" setting. For example, if the "comfort" setting defines a target temperature of 70° F., and if the temperature in an occupied bedroom is 68° F. and the temperature in a kitchen that is likely to be occupied is 74° F., the disaggregated thermostat 410 can control the HVAC system associated with the property 400 to strike a balance in the temperatures of the bedroom and the kitchen that is near the temperature specified by the "comfort" setting.

In some implementations, the various rooms or zones within the property 400 may be given preference depending upon whether a user is physically located there. In the example above, for instance, since the bedroom having a temperature of 68° F. is already occupied, and the kitchen having a temperature of 74° F. is not occupied, the disaggregated thermostat 410 may determine to control the HVAC system such that the temperature in the bedroom is adjusted closer to the preferred temperature of 70° F. than the temperature in the kitchen is (e.g., by giving greater weight to the bedroom). Subsequently, based on determining that the arriving users are within the property 400, or have gone to the kitchen of the property 400, the disaggregated thermostat 410 may give equal preference to both the bedroom and the kitchen, such that the disaggregated thermostat 410 can control the HVAC system to achieve temperatures in both the bedroom and the kitchen that are equally far from the preferred temperature specified by the "comfort" setting. In other examples, based on determining that the arriving users have arrived but have not gone to the kitchen of the property 400 as anticipated, the disaggregated thermostat 410 can remove the environmental conditions of the kitchen from consideration, and can determine control of the HVAC system based solely on the determined locations of the users within the property 400.

FIG. 4B illustrates an example in which a user associated with a client device 440 has moved outside of the threshold distance 490 from the property 400. Based on the disaggregated thermostat 410 determining that there are no users located within the property 400 and that the user associated with the client device 440 has moved beyond the threshold distance 490 from the property 400, the disaggregated thermostat 410 may control the HVAC system associated with the property according to the "economy" setting. As described, the "economy" setting may be a setting that enables the HVAC system associated with the property to use less energy, for example, by running components of the HVAC system less frequently. As described previously, the "economy" setting recognized by the disaggregated thermostat 410 may control the HVAC system associated with the property to achieve a temperature of 75° F. at the property and a relative humidity of 30% at the property. The disaggregated thermostat 410 may access or receive information that indicates the temperature and relative humidity in one or more rooms or zones of the property 400, and may control the components of the HVAC system based on a comparison of the temperature and relative humidity in one or more rooms or zones of the property 400 to the temperature and relative humidity settings specified by the "economy" setting. By using the "economy" setting, the energy usage of the HVAC system may be reduced while the users are away from the property. Subsequently, the system may determine that one or more users have returned to within a threshold distance 490 of the property 400, and may begin to operate the disaggregated thermostat 410 according to the "comfort" setting to adjust the condition of the environmental parameters at the property to the preferred conditions (e.g., the preferred temperature and humidity) specified by the users.

In some implementations, determining to operate an HVAC system according to an "economy" setting or "comfort" setting may involve determining a distance of one or more users from the property 400. For example, based on determining that a user has moved outside of the property 400, but is still within the threshold distance 490 of the property 400, the disaggregated thermostat may determine to control the HVAC system to reach a balance between the two settings. For example, if a "comfort" setting specifies a temperature preference of 70° F. and an "economy" setting specifies a temperature preference of 75° F., the disaggregated thermostat 410 may control the HVAC system to achieve a temperature of 73° F. within the property 400 when the user is located outside of the property 400 but within the threshold distance 490.

In some implementations, determining to transition a setting from a "comfort" setting to an "economy" setting can involve determining the locations of one or more users within the property 400 and identifying or determining the locations of one or more users that have left the property 400. For example, based on determining that a user in a kitchen of the property 400 has left the property 400 but that another user in a bedroom of the property 400 is still located in the bedroom, the disaggregated thermostat 410 can identify an "economy" setting for the kitchen (and/or other parts of the property 400) and a "comfort" setting for the bedroom. The disaggregated thermostat may then control the HVAC system based on the preferences identified by each of the settings. For example, if a "comfort" setting specifies a temperature preference of 70° F. and an "economy" setting specifies a temperature preference of 75° F., the disaggregated thermostat 410 may control the HVAC system to adjust the temperature in the kitchen towards the 75° F. temperature specified by the "economy" setting and to adjust the temperature in the bedroom towards the 70° F. specified by the "comfort" setting.

Additionally, in some implementations, the disaggregated thermostat 410 may consider activity profiles when determining to use a "comfort" or "economy" setting. For example, user activity data may indicate that one or more users typically leave the property 400 around 8:00 AM. Based on the activity profile, the disaggregated thermostat 410 may transition control of the HVAC system from the "comfort" setting to the "economy" setting shortly before the one or more users typically leave the property, for example, at 7:45 AM. In other examples, the activity profile may indicate that a user typically leaves the property 400 between the hours of 8:00 AM and 11:00 AM each day, and that the user always is located in the kitchen before they leave the property 400. Based on determining, for example, that a current time is 9:00 AM and that the user is located in the kitchen of the property 400, the disaggregated thermostat 410 may transition control of the HVAC system from the "comfort" setting to the "economy" setting.

In some implementations, determining the setting used by the disaggregated thermostat to determine control of the one or more HVAC system components is based on determining that a user has left or is approaching the property 400. For example, based on determining that a user has left the property (e.g., that users were previously located at the property 400 and are no longer located at the property 400) or based on determining that a user is moving further away from the property (e.g., based on GPS data that indicates that the user is moving away from the property 400), the disaggregated thermostat 410 may transition the settings used in determining control of the HVAC system components from a "comfort" setting to an "economy" setting. Similarly, in another example, based on determining that a user has entered the property 400 (e.g., that users were not previously located at the property 400 and are now located at the property 400) or is approaching the property (e.g., based on GPS data that indicates that the user is moving towards the property 400), the disaggregated thermostat 410 may transition the settings used in determining control of the HVAC system components from an "economy" setting to a "comfort" setting.

Figure 5A:
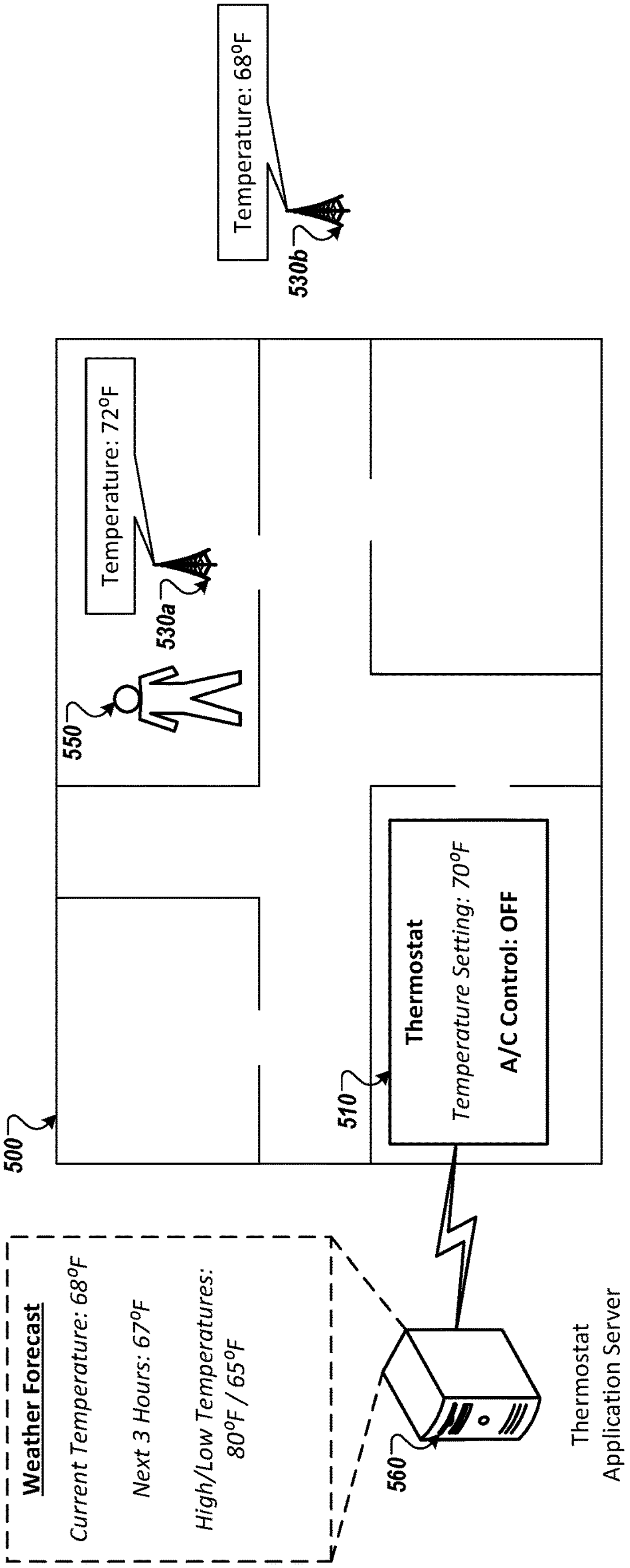
FIGS. 5A-5C illustrate an example of controlling an HVAC system based on weather information.
Figure 5B:
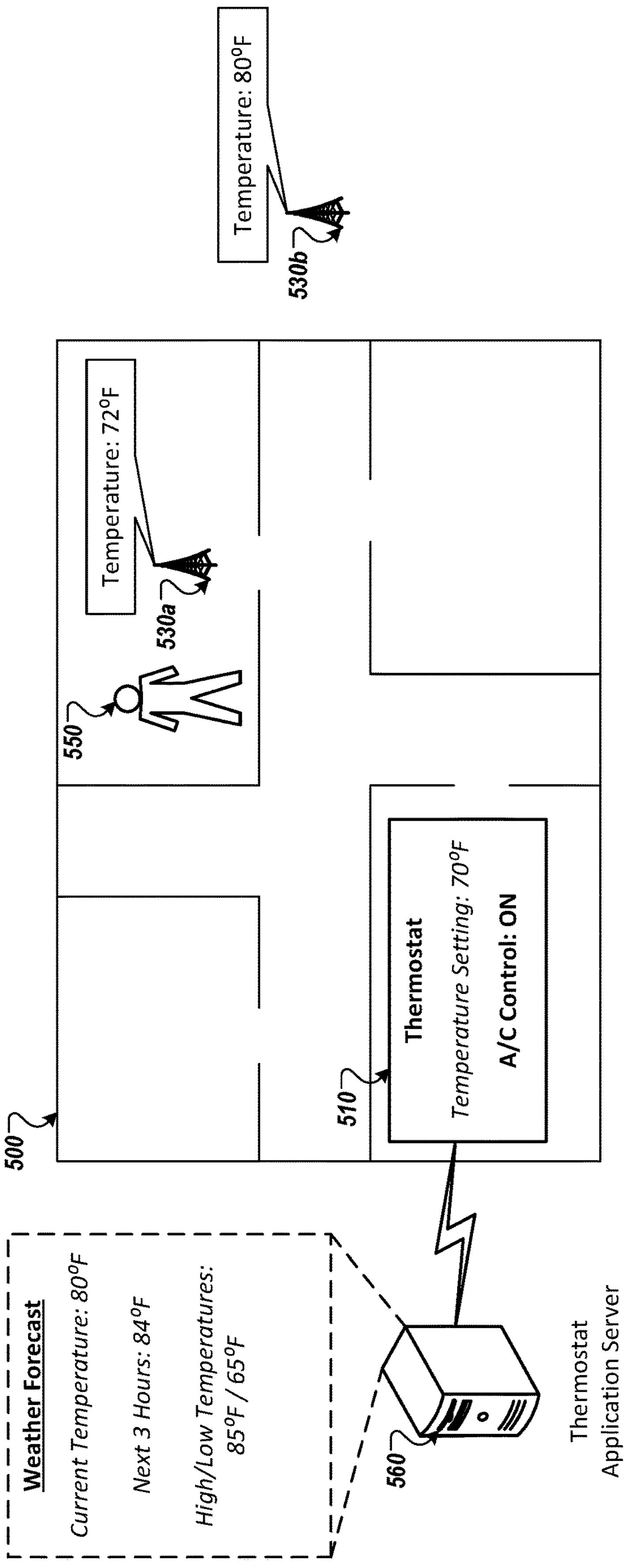
Figure 5C:
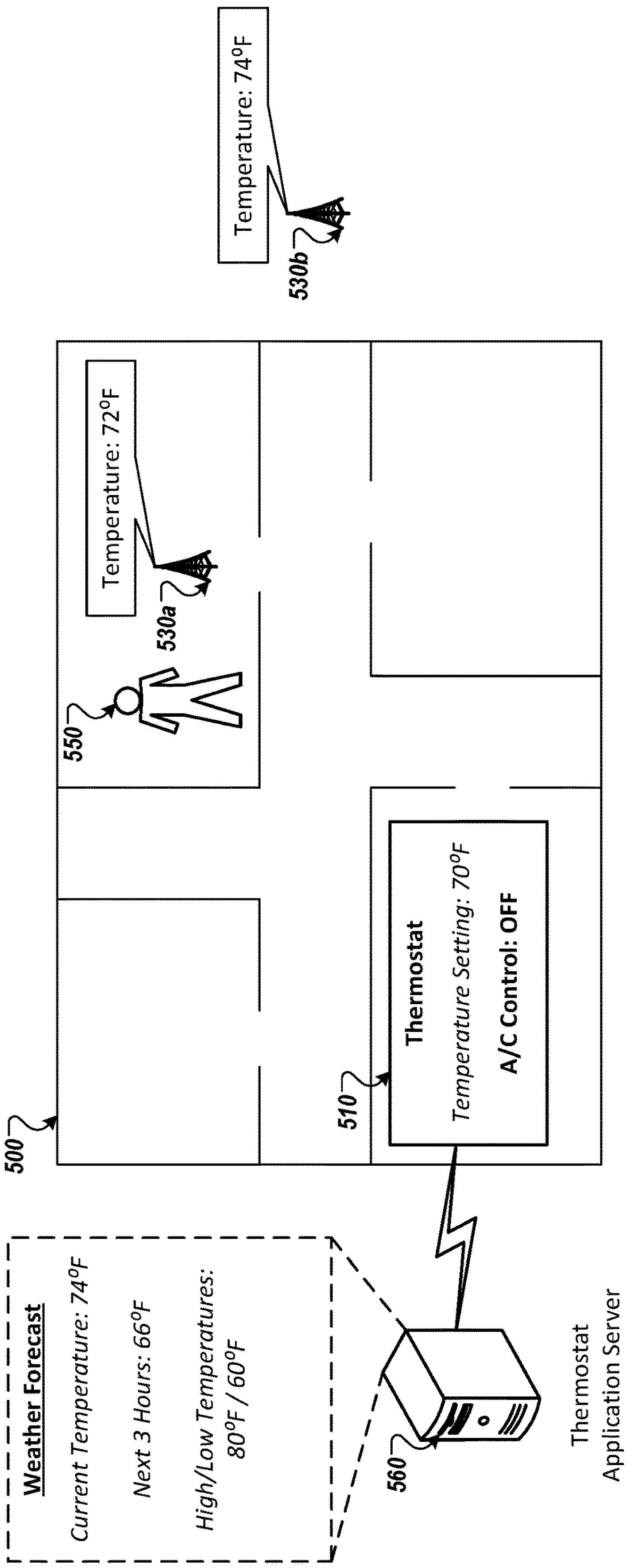

FIGS. 5A-5C illustrate an example in which the control of an HVAC system is determined based at least in part on weather information. For example, a property 500 may be associated with a disaggregated thermostat 510 that is capable of receiving information relating to the condition of environmental parameters outside of the property 500 and/or of receiving information relating to weather forecasts for a geographic region that corresponds to the location of the property 500. The disaggregated thermostat 510 may be able to access such information in addition to the information indicating the presence of users within various rooms or zones of the property 500 and the information indicating the condition of one or more environmental parameters within the various rooms or zones of the property 500. The disaggregated thermostat 510 may control a HVAC system associated with the property 500 based performing an analysis of the weather information, based on determining rooms or zones of the property 500 that are occupied, based on the environmental conditions at the occupied rooms or zones of the property 500, and based on the preferences relating to the environmental parameters for the property 500.

As shown in FIG. 5A, for example, the disaggregated thermostat 510 can receive information indicating a preferred temperature for the property 500 of 70° F. The disaggregated thermostat 510 can receive information indicating that a user 550 is located in a particular room of the property 500 and can receive information from a sensor 530*a* indicating that the temperature in the occupied room of the property is 72° F. The disaggregated thermostat 510 can further receive information from a sensor 530*b* located outside of the property 500 that indicates that the temperature outside of the property is 68° F. The disaggregated thermostat 510 may also access or receive weather forecast data accessible at a thermostat application server 560 that includes a weather forecast for a geographical region that corresponds to the property 500. As shown in FIG. 5A, the weather forecast may indicate a current temperature of 68° F. for the region of the property 500 and may further indicate a temperature prediction for the region of the property 500 that indicates that in three hours the temperature will likely be 67° F. The weather forecast data may further indicate a weather forecast for the day, for example a weather forecast indicating that the high temperature for the day will likely be 80° F. and that the low temperature for the day will likely be 65° F.

The disaggregated thermostat 510 may analyze the received information to determine control of an air conditioner associated with the property 500. For example, the disaggregated thermostat 510 may determine that the temperature in the occupied room of the property 500 is 72° F. and is therefore above the preferred temperature for the property 500 of 70° F. The disaggregated thermostat 510 may also determine, however, that the outside temperature of 68° F. is below the preferred temperature for the property 500, and may determine based on the weather forecast data that the outside temperature is likely to continue to decrease (e.g., that the temperature is likely to be 67° F. in 3 hours and to eventually reach 65° F.). A decision process performed by the disaggregated thermostat 510 may consider these various factors and may determine that the temperature in the property 500 is likely to decrease without the use of the air conditioner, since the temperature outside of the property 500 is currently below the temperature inside of the property 500 and since the outside temperature is expected to continue to decrease. As a result, the disaggregated thermostat 510 may determine to turn off, or not to turn on, the air conditioner associated with the property 500, and may control the air conditioner accordingly. Additionally, in some implementations, the disaggregated thermostat 510 may determine that the occupied room of the property 500 is likely to cool more quickly if an internal circulation fan or external ventilation aided by a circulation fan is activated. Based on this determination, the disaggregated thermostat 510 may control one or more fans associated with the property 500 by turning on the one or more fans. In some implementations, the disaggregated thermostat 510 may turn on the one or more fans based on determining that running the one or more fans is a more economical option than turning on the air conditioner, and based on determining that turning on the one or more fans will allow the temperature in the occupied room to quickly reach the preferred temperature.

FIG. 5B shows another example in which the disaggregated thermostat 510 determines control of an HVAC system associated with the property 500 based at least on weather information available to the disaggregated thermostat 510. For example, the disaggregated thermostat 510 of FIG. 5B has determined that a user 550 is located in a room of the property 500, and that the temperature in the room where the user 550 is located is 72° F. The disaggregated thermostat 510 may further receive information from a sensor 530*b* located outside of the property 500 that indicates that the outside temperature is 80° F., and may access weather forecast information accessible via the thermostat application server 560 that indicates that the temperature in the region corresponding to the location of the property 500 is 80° F. and will be increasing over the next three hours to an estimated temperature of 84° F. The weather forecast may further indicate that the high and low temperatures for the day are expected to be 85° F. and 65° F., respectively. The disaggregated thermostat 510 may determine, based on the received and/or accessed information, that the temperature in the occupied room of the property 500 is likely to continue to rise and to further diverge from the preferred temperature of 70° F. unless the air conditioner associated with the property is turned on. In response to this determination, the disaggregated thermostat 510 can control the air conditioner associated with the property 500 by turning on the air conditioner, thereby cooling the occupied room of the property 500 to the preferred temperature.

FIG. 5C shows another example in which the disaggregated thermostat determines control of one or more HVAC system components associated with the property 500 by analyzing weather information available to the disaggregated thermostat 510. For example, the disaggregated thermostat 510 of FIG. 5C has determined that a user 550 is located in a room of the property 500, and that the temperature in the room where the user is located is 72° F. The disaggregated thermostat 510 can further receive information from a sensor 530*b* that indicates that the temperature at an outside location near the property 500 is 74° F., and may further access weather forecast information via the thermostat application server 560 that indicates that the outside temperature in a region corresponding to the location of the property 500 is 74° F., will be decreasing over the next three hours to 66° F., and that the forecasted daily high and low temperatures are 80° F. and 60° F., respectively. The disaggregated thermostat 510 may determine, based on the received and/or accessed information, that the temperature in the occupied room of the property 500 is above the preferred temperature of 70° F., and that the outside temperature of 74° F. is above both the preferred temperature for the property 500 and the temperature of the occupied room of the property 500. However, based on determining that the outside temperature will be likely decrease and should soon be below the preferred temperature, the disaggregated thermostat 510 may determine that the occupied room of the property 500 may eventually cool to the preferred temperature of 70° F. after the outside temperature decreases below 70° F. As a result, the disaggregated thermostat 510 may determine not to turn on an air conditioner associated with the property 500. In response to this determination, the disaggregated thermostat 510 can control the air conditioner associated with the property 500 by turning the air conditioner off, or if the air conditioner is already turned off, by not turning on the air conditioner.

In some implementations, the disaggregated thermostat 510 may be capable of determining the level of influence that outside weather conditions have on various rooms or zones of the property 500. For example, the disaggregated thermostat 510 may be able to access information that, for each of one or more different rooms or zones of the property 500, indicates whether the condition of one or more environmental parameters within the room or zone is easily affected by outdoor weather conditions. In some implementations, the disaggregated thermostat 510 may access and/or determine such information based on a log of environmental control data for the property 500, in which the outdoor weather is correlated to the environmental conditions within the property 500 at various times (e.g., such that each time is a data point used to determine the correlation). The log may indicate whether particular rooms or zones of the property are affected by outdoor weather, and/or the extent to which the outdoor weather affects the environmental conditions in the rooms or zones. In other implementations, the disaggregated thermostat 510 may be able to access a thermodynamic model determined for the property 500, and may be able to determine which rooms or zones of the property 500 are affected by outdoor weather. For example, the thermodynamic model may indicate that a particular room quickly changes temperature, thereby suggesting that the room is poorly insulated. The disaggregated thermostat 510 may determine that the room is likely to be easily affected by outdoor weather, based on the room being poorly insulated.

When determining control of an HVAC system, the disaggregated thermostat 510 may take into account how easily a particular room or zone of the property 500 is affected by outdoor weather. For example, the situation shown in FIG. 5A displays a scenario in which the temperature (72° F.) in an occupied room of the property 500 is above a preferred temperature (70° F.) for the property 500. Additionally, the temperature (68° F.) outside of the property 500 is below the preferred temperature for the property 500. Based on determining that the occupied room of the property 500 is poorly insulated and therefore greatly affected by outdoor weather conditions, the disaggregated thermostat 510 may determine that the occupied room will likely cool to the preferred temperature of 70° F. relatively quickly as a result of the outdoor temperature being below the preferred temperature (e.g., within a threshold period of time). The disaggregated thermostat 510 may therefore turn off or determine not to turn on an air conditioner associated with the property 500. In another example, based on determining that the occupied room of the property 500 is moderately insulated and is therefore moderately affected by outdoor weather conditions, the disaggregated thermostat 510 may determine to set an air conditioner to a low setting, such that the occupied room 500 will be cooled to the preferred temperature based on the combination of operating the air conditioner and the outside temperature being below the preferred temperature. Based on determining that the occupied room of the property 500 is well insulated and is therefore only slightly affected by outdoor weather, the disaggregated thermostat 510 may determine to set an air conditioner to a high setting. As a result, the air conditioner will cool the occupied room to the preferred temperature without additional aid from the outdoor weather, since the outdoor temperature is unlikely to cool the occupied room to a great degree.

In some implementations, the disaggregated thermostat 510 may consider other factors when determining the control of one or more HVAC system components using weather information. For example the disaggregated thermostat 510 may consider a rate at which an environmental parameter, such as outdoor temperature or relative humidity, is changing or is expected to change. In other examples, the disaggregated thermostat 510 may consider the expected time until a weather event occurs, for example, the expected time until the outdoor temperature decreases to a target temperature. The disaggregated thermostat 510 may determine a difference between an outdoor environmental parameter (e.g., an outdoor temperature or forecasted outdoor temperature) and a preference for the environmental parameter or a condition of the environmental parameter in one or more locations of the property 500, and may consider the difference when determining control of the one or more HVAC system components. Other weather information may also be considered when determining control of the HVAC system using the weather information. For example, the disaggregated thermostat 510 may receive and/or determine information indicating a heat index, wind chill, barometric pressure, or other weather information, and may consider such information when determining how to control the one or more HVAC system components. For example, even if the temperature in the property 500 is slightly above the preferred temperature and an outdoor temperature near the property 500 is below the preferred temperature, as shown in FIG. 5A, the disaggregated thermostat may still determine to turn on an air conditioner associated with the property 500 if the relative humidity in the property is above a preferred humidity level, based on the disaggregated thermostat 510 determining that turning on the air conditioner may reduce the relative humidity within the property 500.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:

maintaining, in memory and for a property, an activity model that indicates patterns of use or movement at the property and was generated using first sensor data from one or more sensors at the property; and while maintaining the activity model:

receiving, from a sensor at the property, second sensor data separate from the first sensor data used to generate the activity model;

determining, using the second sensor data and the activity model, whether a criterion for a device is true; and controlling, using a result of the determination, a setting that affects a functioning of the device at the property.

2. The method of claim 1, comprising:

accessing first sensor data captured by the one or more sensors at the property;

detecting, using the accessed first sensor data, the patterns of use or movement at the property; and generating, using the detected patterns, the activity model that indicates the patterns of use or movement at the property.

3. The method of claim 2, wherein detecting the patterns of use or movement at the property comprises detecting occupancy patterns at the property.

4. The method of claim 1, comprising:

after controlling the setting of the device at the property, receiving, from a second sensor from the one or more sensors at the property, third sensor data;

detecting, using the third sensor data, a new pattern of use or movement at the property; and updating, using the detected new pattern, the activity model to indicate the new pattern of use or movement at the property.

5. The method of claim 4, wherein detecting the new pattern of use or movement at the property comprises detecting at least one of: i) movement between two zones at the property that was not represented in the patterns of use or movement at the property, or ii) a lack of people in a first zone at the property while detecting one or more people in a second, different zone at the property.

6. The method of claim 1, wherein controlling the setting of the device at the property comprises:

determining, using at least some of the sensor data, that a location at the property is currently unoccupied;

predicting, for the location at the property that is currently unoccupied and using at least some of the sensor data and the activity model, that the location will be occupied within a threshold period of time; and controlling the setting of the device for the location at the property.

7. The method of claim 1, wherein controlling the setting comprising controlling a setting of a heating, ventilation, and air conditioning system or a fan.

8. The method of claim 1, wherein controlling the setting comprises controlling a temperature or a humidity of the device at the property.

9. A system comprising one or more computers and one or more storage devices on which are stored instructions that are operable, when executed by the one or more computers, to cause the one or more computers to perform operations comprising:

maintaining, in memory and for a property, a historical activity model that indicates historical patterns of use or movement at the property and was generated using first sensor data from one or more sensors at the property; and while maintaining the activity model:

receiving, from a sensor at the property, second sensor data that has a different type than the first sensor data;

determining, using the second sensor data and the historical activity model for the property, whether a criterion for a device is true; and controlling, using a result of the determination, a setting that affects a functioning of the device at the property.

10. The system of claim 9, the operations comprising:

accessing first sensor data captured by the one or more sensors at the property;

detecting, using the accessed first sensor data, the patterns of use or movement at the property; and generating, using the detected patterns, the historical activity model that indicates the historical patterns of use or movement at the property.

11. The system of claim 10, wherein detecting the patterns of use or movement at the property comprises detecting occupancy patterns at the property using occupancy data as the first sensor data, and the second sensor data comprises temperature sensor data.

12. The system of claim 9, the operations comprising:

after controlling the setting of the device at the property, receiving, from a second sensor from the one or more sensors at the property, third sensor data;

detecting, using the third sensor data, a new pattern of use or movement at the property; and updating, using the detected new pattern, the activity model to indicate the new pattern of use or movement at the property.

13. The system of claim 12, wherein detecting the new pattern of use or movement at the property comprises detecting at least one of: i) movement between two zones at the property that was not represented in the patterns of use or movement at the property, or ii) a lack of people in a first zone at the property while detecting one or more people in a second, different zone at the property.

14. The system of claim 9, wherein controlling the setting of the device at the property comprises:

determining, using at least some of the sensor data, that a location at the property is currently unoccupied;

predicting, for the location at the property that is currently unoccupied and using at least some of the sensor data and the activity model, that the location will be occupied within a threshold period of time; and controlling the setting of the device for the location at the property.

15. The system of claim 9, wherein controlling the setting comprising controlling a setting of a heating, ventilation, and air conditioning system or a fan.

16. The system of claim 9, wherein controlling the setting comprises controlling a temperature or a humidity of the device at the property.

17. One or more non-transitory computer storage media encoded with instructions that, when executed by one or more computers, cause the one or more computers to perform operations comprising:

maintaining, in memory and for a property, an activity model that indicates patterns of use or movement at the property and was generated using first sensor data from one or more sensors at the property; and while maintaining the activity model:

receiving, from a sensor at the property, second sensor data separate from the first sensor data used to generate the activity model;

determining, using the second sensor data and the activity model, whether a criterion for a device is true; and controlling, using a result of the determination, a setting that affects a functioning of the device at the property.

18. The computer storage media of claim 17, the operations comprising:

accessing first sensor data captured by the one or more sensors at the property;

detecting, using the accessed first sensor data, the patterns of use or movement at the property; and generating, using the detected patterns, the activity model that indicates the patterns of use or movement at the property.

19. The computer storage media of claim 18, wherein detecting the patterns of use or movement at the property comprises detecting occupancy patterns at the property.

20. The computer storage media of claim 17, the operations comprising:

after controlling the setting of the device at the property, receiving, from a second sensor from the one or more sensors at the property, third sensor data;

detecting, using the third sensor data, a new pattern of use or movement at the property; and updating, using the detected new pattern, the activity model to indicate the new pattern of use or movement at the property.

* * * * *